United States Patent
Kobayashi et al.

(10) Patent No.: US 6,399,189 B1
(45) Date of Patent: *Jun. 4, 2002

(54) FOAMABLE THERMOPLASTIC SHEET-LIKE SYNTHETIC RESIN, THERMOPLASTIC FOAMED RESIN AND THEIR PRODUCTION METHOD

(75) Inventors: Tomoyuki Kobayashi; Kenji Miyazaki; Eiji Nagara; Michiaki Sasayama; Mitsuo Okubo, all of Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/125,009
(22) PCT Filed: Dec. 25, 1997
(86) PCT No.: PCT/JP97/04807
 § 371 Date: Aug. 25, 1998
(87) PCT Pub. No.: WO98/29228
 PCT Pub. Date: Jul. 9, 1998

(30) Foreign Application Priority Data

Dec. 26, 1996 (JP) ................................. 8-347997

(51) Int. Cl.[7] .............................. B32B 3/12; B32B 1/00; B32B 3/26; B32B 5/14
(52) U.S. Cl. .................... 428/316.6; 428/158; 428/178; 428/304.4; 428/309.9
(58) Field of Search .................... 428/158, 178, 428/309.4, 309.9, 316.6

(56) References Cited

U.S. PATENT DOCUMENTS 4,241,125 A * 12/1980 Canning et al. ............ 428/158
5,030,501 A * 7/1991 Colvin et al. ............... 428/178
5,939,180 A * 8/1999 Kobayashi ................ 428/304.4

FOREIGN PATENT DOCUMENTS

| JP | 56-16054 | 4/1981 |
| JP | 60-45579 | 10/1985 |
| JP | 7-16856 | 1/1995 |

* cited by examiner

Primary Examiner—Blaine Copenheaver
Assistant Examiner—Christopher C. Pratt
(74) Attorney, Agent, or Firm—Rader, Fishman & Grauer

(57) ABSTRACT

A sheet-form structure of expandable thermoplastic resin is provided which is capable of undergoing a pseudo-one-dimensional expansion in its thickness direction and which enables manufacture of thermoplastic resin foams having reduced variations in thickness and weight precisions, increased compressive strength, and excellent properties such as surface smoothness. A method of manufacturing the sheet-form structure, as well as such thermoplastic resin foams, are also provided. A sheet-form structure 1 of expandable thermoplastic resin including granules 2 of expandable thermoplastic resin arranged generally uniformly for integral connection thereof through a thin film 3 of expandable thermoplastic resin. A thermoplastic resin foam including a continuous, thermoplastic resin foam layer, a number of highly-expanded, thermoplastic resin portions provided on at least one surface of the continuous foam layer, and slightly-expanded, thermoplastic resin thin films for covering outer surfaces of respective highly-expanded portions.

18 Claims, 9 Drawing Sheets

(a)

(b)

(a)

(b)

(a)

(b)

FOAMABLE THERMOPLASTIC SHEET-LIKE SYNTHETIC RESIN, THERMOPLASTIC FOAMED RESIN AND THEIR PRODUCTION METHOD

TECHNICAL FIELD

The present invention relates to a sheet-form structure of expandable thermoplastic resin, for use in the manufacture of a thermoplastic resin foam, which is capable of undergoing a pseudo-one-dimensional expansion in its thickness direction, thermoplastic resin foams and methods for manufacturing thereof.

BACKGROUND ART

Because of their light-weight properties and excellence in heat insulation, flexibility, floatability and moldability, thermoplastic resin foams have been widely used as various heat insulating materials such as for roof insulations, roof covers for vehicles or floor insulations, cushioning materials, floating materials, or profiles.

In obtaining such thermoplastic resin foams, prior manufacturing methods typically heat a sheet of expandable thermoplastic resin containing a heat-decomposable blowing agent to a temperature sufficient to decompose the blowing agen t to thereby effect foaming thereof. The foaming of expandable thermoplastic resin sheet is effected by the action of pressure of gases released as the blowing agent contained therein decomposes. Accordingly, the expandable thermoplastic resin sheet, when subjected to foaming, generally expands substantially three-dimensionally in a uniform fashion. In the manufacture of thermoplastic resin foams, especially in the continuous manufacture of elongated thermoplastic resin foams, a measure is needed which reduces the production of wrinkles in the resin foams due to expansion thereof in width and length directions.

In the Japanese Patent Publication No. Sho 48-9955, for example, a method is disclosed which contemplates to reduce wrinkles in a thermoplastic resin foam that will be finally obtained. The method involves feeding a continuous sheet of expandable thermoplastic resin containing a blowing agent for subjecting to heat foaming to obtain a thermoplastic resin foam which is subsequently taken up. This take-up rate is increased relative to the feed rate of the expandable thermoplastic resin sheet, in such a proportion as to correspond to the lengthwise increment of the resin sheet that will be gained as it expands, while the thermoplastic resin foam is stretched in its width direction in such a proportion as to correspond to the widthwise increment of the resin sheet that will be gained as it expands.

However, this method requires complicated jigs and processes for widthwise stretching of the continuously produced thermoplastic resin foam which has been just heated and foamed. In addition, the requirement to stretch the thermoplastic resin foam before it is cooled leads to the reduction in quality of both lateral ends of a resulting thermoplastic resin foam. This necessitates the removal of those lateral ends from the resulting thermoplastic resin foam, which problematically drops the productivity thereof.

Since the above method employs a continuous sheet of expandable thermoplastic resin to form the thermoplastic resin foam, the thermoplastic resin foam thus formed is imparted thereto excellent thickness precision, weight precision and surface smoothness. However, due to its homogeneity in its thickness direction, the resulting thermoplastic resin foam has a problem of poor compressive strength.

Also, in the thermoplastic resin foam obtained in accordance with the above-described method, the planar expansion of the thermoplastic resin caused when subjected to foaming is counterbalanced by the lengthwise elongation and widthwise stretch of thermoplastic resin foam which accompany the forces that will remain therein as a thermal stress. Thus, the resulting thermoplastic resin foam, if subjected to change in temperature, is caused to change its size to a problematically large extent.

Furthermore, the attempt to obtain an irregularly-surfaced thermoplastic resin foam by utilizing the above-referred method results in the necessity of post-forming which provides irregularities to a previously fabricated, plate-form thermoplastic resin foam, and accordingly fails to manufacture the irregularly-surfaced thermoplastic resin foams at high productivity. Due to the homogeneity in its thickness direction, the irregularly-surfaced thermoplastic resin foam obtained also had a problem of insufficient compressive strength.

On the other hand, Japanese Patent Laying-Open No. Hei 7-16856 discloses a method which obtains a sheet-form thermoplastic resin foam by spreading pellets or rounded mass (hereinafter referred to as pellets or the like) of expandable thermoplastic resin containing a blowing agent over a conveying belt, and heating the pellets or the like of expandable thermoplastic resin to effect foaming and expansion for fusive integration thereof.

In accordance with this method, a thermoplastic resin sheet or another conveying belt is provided above the conveying belt to define therebetween a restricted space within which the dispersion of pellets or the like of expandable thermoplastic resin over the lower conveying belt are allowed to be heat foamed, so that a thermoplastic resin foam having a desired thickness can be obtained. Concurrently, the spaces among the pellets or the like of expandable resin, defined in a planar direction of the sheet, are filled as they expand, thereby obtaining a sheet-form thermoplastic resin foam.

Again, in this method, the expandable thermoplastic resin, when subjected to foaming, expands three-dimensionally. However, since the pellets or the like of expandable thermoplastic resin are arranged two-dimensionally in an intermittent manner to provide spaces thereamong, the subsequent, two-dimensional expansion of the pellets or the like of expandable thermoplastic resin fills those spaces. That is, the foam is obtained through the pseudo-one-dimensional expansion of expandable thermoplastic resin in its thickness direction. This eliminates the necessities of widthwise and lengthwise stretch or elongation.

However, if this method is to effect foaming in the form of a pseudo-one dimensional expansion, the spaces must be predetermined which accommodate the increments in area of the pellets or the like of expandable thermoplastic resin as they expand. In order to predetermine the size of spaces, the dispersion of pellets or the like of expandable thermoplastic resin must be controlled with extremely high precision. A spreader thus becomes necessary which can disperse the pellets or the like of expandable thermoplastic resin with precision.

Also, this method contemplates to obtain a sheet-form thermoplastic resin foam by heat fusing the intermittently arranged pellets or the like of expandable thermoplastic resin to unity while subjecting them to foaming. It however presents a problematic possibility that those pellets or the like of expandable thermoplastic resin may not completely be fused to unity. Accordingly, high productivity can not be expected from this method. In addition, if desired to obtain a thermoplastic resin foam having an increased thickness, the size of pellets or the like of expandable thermoplastic resin must be enlarged accordingly. In such an instance, the necessity of uniformly heating the large-sized pellets prolongs the foaming period to thereby reduce productivity.

It is within the knowledge of the present inventors that the spreading of pellets or the like of expandable thermoplastic resin must be controlled with a still higher precision, if particularly desired to obtain an irregularly-surfaced thermoplastic resin foam. That is, where the spaces are determined as excessively larger than for corresponding to the increments in area of the pellets or the like of expandable thermoplastic resin as they expand, there remains a possibility that the pellets or the like of expandable thermoplastic resin, if heat foamed, may not completely be fused to unity. On the other hand, if the determined spaces are smaller than for corresponding to the increments in area of the pellets as they expand, a thermoplastic resin foam will be obtained which is not irregularly-surfaced but in the form of a flat plate.

Accordingly, the aforementioned method requires a spreader for dispersing the pellets or the like of expandable thermoplastic resin in such a highly precise fashion as stated above, and has been extremely difficult to obtain a thermoplastic resin foam having a predetermined irregular configuration.

Also in accordance with the above manufacturing method, an individual pellet or the like of expandable thermoplastic resin, when foamed, produces a skin layer of a low expansion ratio on its surface, resulting in the formation of a thermoplastic resin foam in which highly-expanded portions of thermoplastic resin having peripheries completely covered with respective slightly-expanded thin films of thermoplastic resin are heat fused to each other through the slightly-expanded thin films. The resulting thermoplastic resin foam has a high degree of compressive strength, but its qualities such as thickness precision, weight precision and surface smoothness, as well as the variation in compressive strength, depend largely upon how the pellets or the like of expandable thermoplastic resin are dispersed.

Also in accordance with the above manufacturing method, a pressure developed during foaming acts to fuse bond the neighboring highly-expanded portions through the respective slightly-expanded thin films to thereby assure sufficiently strong fusion bonds. However, the absence of foamed layers continuous in a planar direction of the thermoplastic resin foam obtained, as well as small fusion bond areas, reduces the strength thereof against a flexural load, if applied, to the degree that can not be said to be sufficient.

DISCLOSURE OF THE INVENTION

It is an object of the present invention to provide a sheet-form expandable thermoplastic resin which is capable of expanding pseudo-one-dimensionally in its thickness direction and which enables the highly-productive manufacture of thermoplastic resin foams having reduced variations in thickness and weight precisions as well as excellent qualities such as increased compressive strength and surface smoothness, and a method of manufacturing the sheet-form expandable thermoplastic resin.

It is another object of the present invention to provide a thermoplastic resin foam which can solve the problems encountered with the conventional thermoplastic resin foams, which exhibits less variations in both thickness and weight precisions, which is excellent in surface smoothness and has a high degree of compressive strength, and which exhibits less variation in strength and a sufficient flexural strength, and a method capable of manufacturing the thermoplastic resin foam at high productivity.

It is yet another object of the present invention to provide an irregularly-surfaced thermoplastic resin foam which exhibits less variations in both thickness and weight precisions, which has increased compressive strength and cushioning properties, and which exhibits less variation in strength, and a method capable of manufacturing the thermoplastic resin foam at high productivity.

A first invention of the present application is a sheet-form structure of expandable thermoplastic resin foam characterized in that granules of expandable thermoplastic resin are planarly arranged in a generally uniform manner, and that the individual granules of expandable thermoplastic resin are integrally connected to each other through a thin film of expandable thermoplastic resin, thereby achieving the objects as described above.

In the sheet-form structure of expandable thermoplastic resin according to the first invention, the arrangement of the aforementioned granules of expandable thermoplastic resin is not particularly specified, and may preferably be made in a lattice-like or zigzag fashion.

Also, the integration of the aforementioned granules of expandable thermoplastic resin with the thin film of expandable thermoplastic resin may be accomplished in such a manner that the granules of expandable thermoplastic resin are at vertically central portions thereof integrally connected to each other through the thin film of expandable thermoplastic resin. Alternatively, the granules of expandable thermoplastic resin may be at their respective vertical one ends integrally connected to each other through the thin film of expandable thermoplastic resin.

Also, in the sheet-form structure of expandable thermoplastic resin according to the first invention, a planar member may be laminated onto the thin film of expandable thermoplastic resin to thereby effectively restrain the thin film of expandable thermoplastic resin from expanding in the planar direction.

Also, in the sheet-form structure of expandable thermoplastic resin according to the first invention, the aforementioned granules of expandable thermoplastic resin are preferably comprised of a mixture of a blowing agent, and mutually substantially incompatible, highly-crosslinked thermoplastic resin composition and slightly-crosslinked or uncrosslinked thermoplastic resin composition.

A second invention of the present application provides a method of manufacturing the present sheet-form structure of expandable thermoplastic resin in a simplified fashion, and is characterized that a sheet-form structure of expandable thermoplastic resin, while in a softened state, is introduced between a pair of counterrotating shaping rolls, which define therebetween a clearance smaller in dimension than a thickness of the sheet-form structure of expandable thermoplastic resin and at least one of which has a number of generally uniformly arranged recesses on its peripheral surface, to compressively force a portion of the sheet-form structure of expandable thermoplastic resin in a softened state into the recesses, and subsequently cooled and released.

The third invention of the present application is a thermoplastic resin foam characterized that the thermoplastic resin foam includes a continuous foam layer of thermoplastic resin, a number of highly-expanded portions of thermoplastic resin arranged on at least one surface of the continuous foam layer, and sightly-expanded thin films of thermoplastic resin for covering outer surfaces of respective highly-expanded portions, and that the highly-expanded portions are integrally connected to each other through the slightly-expanded thin films, thereby achieving the objects as described above.

In the thermoplastic resin foam according to the third invention, it is preferred that the highly-expanded portions are provided exclusively on one surface of the continuous foam layer in a manner not to vertically overlap each other but to vertically define a single layer, and that they are laterally heat fused to each other through the slightly-expanded thin films.

Also, in the thermoplastic resin foam according to a particular aspect of the third invention, the highly-expanded portions are provided on opposite surfaces of the continuous foam layer. On each surface, they are arranged in a manner not to vertically overlap each other but to vertically define a single layer, and are laterally fused to each other through the slightly-expanded thin films.

A fourth invention of the present application is a thermoplastic resin foam characterized that the thermoplastic resin foam takes the plate form and includes a continuous foam layer of thermoplastic resin, a number of highly-expanded, thermoplastic resin portions arranged on at least one surface of the continuous foam layer, and slightly-expanded, thermoplastic resin thin films, together with the continuous foam layer, for enclosing the respective highly-expanded portions, and that at least one surface of the plate-form thermoplastic resin foam, located on a side where the highly-expanded portions are uncovered with the continuous foam layer, defines an irregular surface in such a manner as to define concedes at the highly-expanded portions covered with respective slightly-expanded thin films and concaves at portions located between the neighboring highly-expanded portions.

That is, the thermoplastic resin foam according to the fourth invention is a thermoplastic resin foam which has at least one irregularly-defined surface.

In accordance with a particular aspect of the thermoplastic resin foam of the fourth invention, the one surface of thermoplastic resin foam, located on a side where the highly-expanded portions are uncovered with the continuous foam layer which, together with the slightly-expanded thin films, encloses the respective highly-expanded portions, has irregularities in such a manner as to define concedes at the highly-expanded portions covered with the respective slightly-expanded thin films and concaves at portions located between the neighboring highly-expanded portions. The other surface of thermoplastic resin foam, located on a side where the highly-expanded portions are covered with the continuous foam layer, defines concaves at its portions corresponding in location to the respective highly-expanded portions.

The heights of convex portions defined by the highly-expanded portions, out surfaces of which are respectively covered with the respective slightly-expanded thin films, are preferably at least 1 mm.

A packing ratio, which is a proportion in volume of a circumscribing rectangular parallelepiped that is occupied by the circumscribed thermoplastic resin foam, is preferably in the range of 50–90%.

In the thermoplastic resin foams according to the third and fourth inventions, the aforementioned highly-expanded portions, when viewed in a plane, may be arranged in a suitable fashion, preferably in a lattice-like or zigzag fashion.

The thermoplastic resin foams according to the third and fourth inventions may further incorporate a planar member which is laminated onto the aforementioned continuous foam layer.

A fifth invention of the present application provides a method which utilizes the sheet-form structure of expandable thermoplastic resin of the present invention to manufacture the thermoplastic resin foam of the present invention in a simplified manner. The manufacturing method is characterized by the following steps. In a first step, a sheet-form structure of expandable thermoplastic resin incorporating granules of expandable thermoplastic resin, which each contains a blowing agent and planarly arranged in a generally uniform fashion for integral connection to each other through a thin film of expandable thermoplastic resin containing a blowing agent, is heated to a temperature sufficient to decompose the aforementioned blowing agents to effect foaming thereof. In a second step, the foam obtained in the first foaming step is cooled.

In the method according to the fifth invention for manufacturing a thermoplastic resin foam, the aforementioned cooling step is preferably preformed by using a cooling unit which has a space more than sufficient to completely accommodate the sheet-form structure of expandable thermoplastic resin as it expands to leave a clearance therebetween to assure the manufacture of thermoplastic resin foam of the fourth invention which has at least one irregular surface.

The first through fifth inventions of the present application are below described in more detail.

SHEET-FORM STRUCTURE OF EXPANDABLE THERMOPLASTIC RESIN

In the present invention, used as the sheet-form structure of expandable thermoplastic resin containing a blowing agent is the structure wherein granules of expandable thermoplastic resin are integrally connected to each other through a thin film of expandable thermoplastic resin, as described above.

THERMOPLASTIC RESIN FOR USE IN THE SHEET-FORM STRUCTURE OF EXPANDABLE THERMOPLASTIC RESIN

The thermoplastic resin for use in the manufacture of granules and thin film of expandable thermoplastic resin, which together constitute the aforementioned sheet-form structure of expandable thermoplastic resin, is not particularly specified, so far as it is expandable. Examples of such thermoplastic resins include olefin resins such as low-density polyethylene, high-density polyethylene, straight-chain low-density polyethylene ("polyethylene" will be hereinafter used to refer to low-density polyethylene, high-density polyethylene, straight-chain low-density polyethylene, or any mixture thereof), random polypropylene, homopolypropylene, block polypropylene ("polypropylene" will be hereinafter used to refer to random polypropylene, homopolypropylene, block polypropylene, or any mixture thereof); olefin copolymers such as ethylene-vinyl acetate resin; polyvinyl chloride, chlorinated polyvinyl chloride, ABS resin, polystyrene, polycarbonate, polyamide, polyvinylidene fluoride, polyphenylene sulfide, polysulfone, polyether ketone, and copolymers thereof. These can be employed solely or in any combination thereof.

Among the above-listed thermoplastic resins, the use of olefin resins such as polyethylene and polypropylene, or any mixture containing thereof is preferred for their abilities to not only impart increased surface smoothness to the thermoplastic resin foams obtained in the third invention, but also facilitate the formation of surface irregularities in the fourth invention. The use of high-density polyethylene, homopolypropylene or a mixture containing at least one of them is particularly preferred, for the purpose of obtaining reconciled surface smoothness and compressive strength in the third invention, as well as increased compressive strength in the fourth invention.

The thermoplastic resins for respective uses in the granule and thin film of expandable thermoplastic resin are not necessarily of the same type, but the same type of resin is preferably employed from the standpoints of expandability and adhesion.

When necessary, the thermoplastic resin for use in the aforementioned sheet-form structure of expandable thermoplastic resin may be crosslinked. The use of crosslinked thermoplastic resin is preferred, since it serves to improve an expansion ratio and leads to weight reduction of a resulting thermoplastic resin foam. Any technique may be employed which crosslinks thermoplastic resins. Exemplary thereof are (1) a technique which melt mixes a silane-grafted polymer with a thermoplastic resin and subsequently treats the mixture with water for crosslinking, (2) a technique which melt mixes a thermoplastic resin with a peroxide at a temperature of lower than a decomposition temperature of the peroxide and subsequently heats the mixture to a temperature of not lower than the decomposition temperature of the peroxide for crosslinking, and (3) a technique which involves exposure to an ionizing radiation for crosslinking.

The above-cited crosslinking technique (1), which utilizes the silane-grafted polymer, will be now explained. The silane-grafted polymer, as described above, is not particularly specified, and may be silane-grafted polyethylene or silane-grafted polypropylene, for example. The silane-grafted polymer is obtainable, for example, by graft modifying a polymer with an unsaturated silane compound.

The aforementioned unsaturated silane compound is a compound represented by the general formula $R^1SIR^2{}_mY_{3-m}$, wherein m is 0, 1 or 2.

In the formula, $R^1$ represents organic functional groups which include alkenyl groups such as vinyl, allyl, propenyl, and cyclohexenyl; glycidyl; amino; methacryl; and halogenated alkyl groups such as γ-chloroethyl and γ-bromoethyl.

In the formula, $R^2$ represents an aliphatic saturated hydrocarbon group or aromatic hydrocarbon group, and may be methyl, ethyl, propyl, decyl or phenyl, for example.

In the formula, Y represents a hydrolyzable organic functional group, and may be methoxy, ethoxy, formyloxy, acetoxy, or propionoxyarylamino, for example. When m is 0 or 1, Y's may be identical to or different from each other.

In order to increase a crosslinking reaction, a compound represented by the general formula $CH_2=CHSi(OA)_3$ may preferably be employed as the aforementioned unsaturated silane compound. In this formula, A is an aliphatic saturated hydrocarbon group containing preferably 1–8, more preferably 1–4 carbon atoms. Preferred unsaturated silane compounds as represented by $CH_2=CHSi(OA)_3$ include vinyltrimethoxysilane and vinyltriethoxysilane, for example.

Generally employed techniques may be utilized to manufacture the aforementioned silane-grafted polymer, without any particular limitation. One exemplary technique involves reacting polyethylene with the aforementioned unsaturated silane compound represented by $R^1SIR^2{}_mY_{3-m}$ and an organic peroxide to obtain silane-modified polyethylene.

For the above silane-grafted polymers having a silyl group, Y, if methoxy, is hydrolyzed when contacted with water to form a hydroxyl group. The hydroxyl groups in different molecules react with each other to form Si—O—Si linkages, so that the silane-grafted polymers are crosslinked to each other.

The above-described water treatment technique includes a steam exposure technique, as well as a water immersion technique. In the case where such a treatment is carried out at a temperature of higher than 100° C., it may be performed under pressure.

Reduction in temperature of water or steam for the treatment leads to a decreased crosslinking reaction rate, while an excessive elevation in temperature thereof results in heat adhesion of the expandable thermoplastic resin. Accordingly, the temperature may preferably be in the range of 50–130° C., most preferably in the range of 90–120° C.

Also, since a shortened treatment period possibly prevents the crosslinking reaction from going to completion, the preferred period for water treatment is in the range of 0.5–12 hours.

A technique for mixing the silane-grafted polymer is not particularly limited, so far as it provides a uniform mixture thereof. Illustrative techniques include a technique which feeds a thermoplastic resin, as well as the silane-grafted polymer, into a single- or twin-screw extruder for melt mixing thereof, a technique which utilizes a roll for melt mixing, and a technique which utilizes a kneader for melt mixing.

If an excessively larger amount of silane-grafted polymer is added, excessive crosslinking may takes place to reduce an expansion ratio of a resulting thermoplastic resin foam. On the other hand, an excessively smaller amount thereof causes breakage of cells, resulting in failure to obtain uniformly expanded cells. Accordingly, the amount of silane-grafted polymer to be added is preferably 5–50 parts by weight, more preferably 20–35 parts by weight, based on 100 parts by weight of thermoplastic resin.

Also, when the silane-grafted polymer is employed to achieve silane-crosslinking, a catalyst for silane-crosslinking may be utilized as necessary. The catalyst for silane-crosslinking is not particularly specified, so far as it acts to promote a crosslinking reaction between silane-grafted polymers. Examples of such catalysts include dibutyltin diacetate, dibutyltin dilaurate, dioctyltin dilaurate, stannous octoate, stannous oleate, lead octoate, zinc 2-ethylhexoate, cobalt octoate, lead naphthenate, zinc caprylate, and zinc stearate.

If an excessively larger amount of catalyst for silane-crosslinking is added, a thermoplastic resin foam may be obtained which exhibits a reduced expansion ratio. On the other hand, if an excessively smaller amount of catalyst is added, the crosslinking reaction rate may decrease to necessitate a prolonged water treatment. Accordingly, the addition amount of catalyst for silane-crosslinking may be preferably in the range of 0.001–10 parts by weight, more preferably 0.01–0.1 parts by weight, based on 100 parts by weight of the aforementioned thermoplastic resin.

The above-cited technique (2), which utilizes a peroxide for crosslinking a thermoplastic resin, will be now explained.

The peroxide for use in the present method is not particularly specified, and may be dibutyl peroxide, dicumyl peroxide, tert-butylcumyl peroxide, or di-isopropyl peroxide, for example. The use of dicumyl peroxide or tert-butylcumyl peroxide is perferred since their decomposition temperatures are closer to a melting point of the thermoplastic resin. Particularly preferred is dicumyl peroxide.

If an excessively larger amount of peroxide is added, a decomposition reaction of thermoplastic resin may be allowed to proceed favorably, resulting in the formation of colored thermoplastic resin foam. On the other hand, if an excessively smaller amount of peroxide is added, insufficient crosslinking of thermoplastic resin may result. Accordingly, the peroxide is added in the amount preferably of 0.5–5 parts by weight, most preferably of 1–3 parts by weight, based on 100 parts by weight of thermoplastic resin.

The above-cited technique (3), which involves exposing a thermoplastic resin to an ionizing radiation for crosslinking thereof, will be now explained.

The higher doses of irradiation lead to excessive crosslinking which causes reduction in expansion ratio of a resulting foam. The lower doses of irradiation cause breakage of expanded cells, resulting in the failure to obtain uniform expanded cells. Accordingly, suitable dosages may be preferably in the range of 1–20 Mrads, more preferably 3–10 Mrads.

Any technique may be employed which exposes a thermoplastic resin to an ionizing radiation. An exemplary technique involves passing a thermoplastic resin between a pair of opposing electron beam generators for exposing an electron beam to the thermoplastic resin.

The thermoplastic resin for use in the manufacture of the aforementioned sheet-form structure of expandable thermoplastic resin preferably comprises a mixture of a highly-crosslinked thermoplastic resin composition and a slightly-crosslinked or uncrosslinked thermoplastic resin composition, which compositions are substantially incompatible with each other. Since the slightly-crosslinked or uncrosslinked thermoplastic resin composition, when foamed, tends to flow, the use thereof not only serves to impart increased surface smoothness to a resulting thermoplastic resin foam in the third invention, but also facilitates the formation of irregularities in a resulting thermoplastic resin foam in the fourth invention.

In the descriptions which follow, the words "thermoplastic" or "thermoplastic resin" may suitably be omitted for simpler terminology.

The "highly-crosslinked" of the highly-crosslinked resin composition, and "slightly-crosslinked or uncrosslinked" of the slightly-crosslinked or uncrosslinked resin composition are relative expressions as determined depending upon whichever resin composition is higher or lower in crosslinking level. Out of the two types of resin compositions, the resin composition having a relatively higher level of crosslinking is referred to as the highly-crosslinked resin composition (A). The other resin composition having a relatively lower level of crosslinking is referred to as the slightly-crosslinked or uncrosslinked resin composition (B).

The highly-crosslinked resin composition (A) is a resin composition comprised primarily of a resin component (A'). The slightly-crosslinked or uncrosslinked resin composition (B) is a resin composition comprised primarily of a resin component (B'). Thus, where a mixture of mutually substantially incompatible, highly-crosslinked resin composition (A) and slightly-crosslinked or uncrosslinked resin composition (B) is employed as a thermoplastic resin for constituting the sheet-form structure of expandable thermoplastic resin, their respective primary components, i.e., the resin components (A') and (B') show the substantial incompatibility with each other.

Thermoplastic resins for use as the mutually substantially incompatible, two types of resin components (A') and (B') can be selected from the above-listed thermoplastic resins.

The difference in solubility parameter between the two types of thermoplastic resins may be controlled preferably in the range of 0.1–2.0, more preferably 0.2–1.5, to form uniformly fine resin components (A') and (B').

If the solubility parameter difference exceeds 2.0, a coarser dispersion of resin components (A') and (B') may be established, leading to reduction in expansion ratio of a resulting foam. On the other hand, if the solubility parameter difference falls below 0.1, the increased compatibility of two types of thermoplastic resins may prevent the formation of resin components (A') and (B').

The numerical value of solubility parameter, as described above, can be calculated from the equation $\sigma = \rho \Sigma\, Fi/M$. $\rho$ is a density of a resin component, M is a molecular weight of a monomer which constitutes the resin component, and Fi is a number of moles each monomer-constituting group attracts.

If the difference in melt index (MI) between the above two types of thermoplastic resins becomes larger, a coarser dispersion of resin components (A') and (B') may be produced, leading to reduction in expansion ratio of a resulting foam. On the other hand, if it becomes smaller, the increased compatibility of two types of thermoplastic resins may prevent the formation of resin components (A') and (B'). Therefore, the MI difference is controlled preferably in the range of 5–13 g/10 minutes, more preferably 7–11 g/10 minutes, for the purposes of establishing a uniform and fine dispersion of resin components (A') and (B'), as well as obtaining a thermoplastic resin foam having an increased expansion ratio.

In the present specification, MI is a value determined according to JIS K7210.

For the purposes of establishing a uniform dispersion of resin components (A') and (B'), as well as obtaining a thermoplastic resin foam having increased surface smoothness and expansion ratio, a mixing ratio in weight of the highly-crosslinked resin composition (A) to the slightly-crosslinked or uncrosslinked resin composition (B) is set desirably in the range of 2:8–8:2, preferably 4:6–6:4, more preferably at 5:5.

If the crosslinking level of highly-crosslinked resin composition (A) is excessively high, excessive crosslinking may result in the reduction in expansion ratio of a resulting thermoplastic resin foam. On the other hand, if it is excessively low, cells may break during expansion to result in failure to obtain uniform cells. Its gel fraction, as indicative of crosslinking level, is thus controlled preferably in the range of 5–60 weight %, more preferably 10–30 weight %.

If the crosslinking level of slightly-crosslinked or uncrosslinked resin composition (B) is excessively high, excessive crosslinking may result in the reduction in flowability of a resulting thermoplastic resin foam. This may cause reduction in surface smoothness of thermoplastic resin foams in the third invention, as well as difficulty in forming irregularities in the fourth invention. Therefore, its gel fraction, as indicative of crosslinking level, is preferably not greater than 5 weight %, more preferably not greater than 3 weight %.

The gel fraction, as used in the present specification, refers to a percentage of a weight of crosslinked resin component remained after immersion in a 120° C. xylene solution for 24 hours relative to a weight of crosslinked resin component prior to immersion in the xylene solution.

Preparation of the mixture of mutually substantially incompatible, highly-crosslinked resin component (A) and slightly-crosslinked or uncrosslinked resin component (B)

can be accomplished by mixing the aforementioned two types of thermoplastic resins, and crosslinking the resin component (A') either solely or preferentially relative to the resin component (B').

Exemplary techniques of crosslinking the resin component (A') either solely or preferentially relative to the resin component (B') include (1) a technique which employs a crosslinking agent capable of crosslinking the resin component (A') either solely or preferentially relative to the resin component (B'), and (2) a technique which, at a first stage, mixes the resin component (A') with a crosslinkable group-containing crosslinkable resin (C) of the same type as the resin component (A') for subsequent crosslinking thereof to form the highly-crosslinked resin composition (A), and then mixes the composition with the resin component (B') at a second stage.

However, most preferred is (3) a technique wherein a crosslinkable group-containing crosslinkable resin (C), which is approximate in melt index to and of the same type as the resin component (A'), is mixed with the resin components (A') and (B') for subsequent crosslinking, since the technique can form a fine and uniform dispersion of resin components (A') and (B'), facilitates preferential crosslinking of resin component (A'), and allows one to readily prepare the thermoplastic resin.

The crosslinkable group-containing crosslinkable resin (C), which is approximate in melt index to and of the same type as the resin component (A'), is not particularly specified, so far as it is a crosslinkable thermoplastic resin having a reactive functional group. Exemplary of such crosslinkable resins (C) are the thermoplastic resins described above as having an unsaturated group such as vinyl, allyl or propenyl, or a hydroxyl, carboxyl, epoxy, amino, silanol, or silanoate group.

Specific examples of the crosslinkable resin (C) include maleic acid modified polyethylene, maleic acid modified polypropylene, silane modified polyethylene, and silane modified polypropylene. Silane modified polyethylene and silane modified polypropylene are most preferred for their abilities to readily crosslink with the resin component (A') solely or preferentially over the resin component (B') and to readily crosslink after mixed.

If the difference in melt index between the resin component (A') and the crosslinkable resin (C) is larger, it becomes more difficult for the crosslinkable resin to crosslink with the resin component (A') solely or preferentially over the resin component (B'). Accordingly, the difference in: melt index is preferably not greater than 2 g/10 minutes, more preferably not greater than 1 g/10 minutes.

Exemplary techniques of crosslinking the aforementioned crosslinkable resin (C) include the use of peroxide for crosslinking, the use of isocyanate for crosslinking, the use of amine for crosslinking, and hydrolysis of a reactive functional group for subsequent aqueous crosslinking.

The technique which hydrolyzes the reactive functional group for subsequent aqueous crosslinking is most preferred for its ability to readily crosslink the resin after mixed.

BLOWING AGENT

In the present invention, a heat-decomposable blowing agent is employed as the blowing agent contained in the aforementioned, thermoplastic resin granules and thin film.

The heat-decomposable blowing agent is not particularly specified, so far as it exhibits a decomposition temperature of higher than a melting temperature of the thermoplastic resin used. Examples of heat-decomposable blowing agents include inorganic heat-decomposable blowing agents such as sodium bicarbonate, ammonium carbonate, ammonium bicarbonate, azido compounds, and sodium borohydride; azodicabonamide, azobisformamide, azobisisobutyronitrile, barium azodicarboxylate, diazoaminobenzene, N, N'-dinitrosopentamethylenetetramine, p-toluenesulfonyl hydrazide, p, p'-oxybis(benzene sulfonyl hydrazide), and trihydrazine triazine. The use of azodicarbonamide is preferred because its decomposition temperature and rate are readily controllable, and because it generates a larger volume of gases and has a higher level of hygienic quality.

If the aforementioned heat-decomposable blowing agent is added in an excessively larger amount, bubble breakage may occur to result in the formation of nonuniform cells. On the other hand, if added in an exvessively smaller amount, insufficient foaming may result. It is accordingly preferred that the heat-decomposable blowing agent is added in the amount of 1–25 parts by weight, based on 100 parts by weight of thermoplastic resin.

OTHER APPLICABLE ADDITIVES

When desired to impart increased strength to resulting thermoplastic resin foams, a reinforcing material such as a glass, carbon or polyester short fiber; and/or a filler such as calcium carbonate, aluminum hydroxide or glass powder may be added to the; thermoplastic resins respectively for use in the thermoplastic resin granules and thin film.

In the case where the aforementioned short fiber is added as a reinforcement, if it is added in an excessively higher proportion, cell breakage may be caused during foaming to result in failure to obtain a foam having an increased expansion ratio. On the other hand, if added in an excessively lower proportion, an insufficient reinforcing effect may be imparted to a resulting foam. Accordingly, if desired to incorporate the aforementioned short fiber, it is added in the amount of preferably 1–20 parts by weight, most preferably 3–10 parts by weight, based on 100 parts by weight of thermoplastic resin.

If a length dimension of the short fiber is excessively large, cell breakage may be caused during foaming to result in failure to obtain a foam having an increased expansion ratio. On the other hand, if it is excessively small, a sufficient reinforcing effect may not be imparted to a resulting foam. Accordingly, the length dimension of short fiber is preferably 1–20 mm, most preferably 3–5 mm.

In the case where the aforementioned filler is incorporated, if added in a larger amount, cell breakage may be caused during foaming to result in failure to obtain a foam having an increased expansion ratio. On the other hand, if added in a smaller amount, a sufficient reinforcing effect may not be imparted to a resulting foam. The filler is thus added preferably in the amount of 10–100 parts by weight, most preferably 30–50 parts by weight, based on 100 parts by weight of thermoplastic resin.

CONFIGURATION OF SHEET-FORM STRUCTURE OF EXPANDABLE THERMOPLASTIC RESIN

A sheet-form structure of expandable thermoplastic resin is illustrated in FIG. 1 to show an exemplary configuration thereof. The sheet-form structure 1 of expandable thermoplastic resin includes granules 2 of expandable thermoplastic resin integrally connected to each other by a thin film 3 of expandable thermoplastic resin. Stated differently, the aforementioned sheet-form structure 1 of expandable thermoplastic resin is configured such that the granules 2 of expandable thermoplastic resin respectively define pillar-like projections which protrude from one surface of the sheet-form structure 1 of expandable thermoplastic resin. Although the granules 2 of expandable thermoplastic resin are illustrated in FIG. 2 as being at either ends thereof, i.e., at lower ends thereof connected to the thin film 3 of expandable thermoplastic resin, they may alternatively be at vertically near-centered portions thereof connected to the thin film 3 of expandable thermoplastic resin, as will be described hereinafter.

Also in the aforementioned sheet-form structure 1 of expandable thermoplastic resin, the granules 2 of expandable thermoplastic resin are generally uniformly arranged in a lattice-like fashion, as shown in FIG. 2 by a plan view.

The shape of granules of expandable thermoplastic resin is not particularly specified, and may be hexahedral, cylindrical or spherical, for example. However, the cylindrical shape, as shown in FIGS. 1 and 2, is most preferred for its effectiveness to allow uniform expansion of granules of expandable thermoplastic resin.

Where the granules of expandable thermoplastic resin are cylindrically shaped, a diameter of cylinder is not particularly limited since it depends upon the particular expansion ratio and thickness sought for a target foam. If the diameter is excessively large, a decreased expansion rate may result. On the other hand, if it is excessively small, the cylinders show an increased tendency to melt, due to the effect of heat generated during expansion, and become deformable to result in failure to exhibit one-dimensional expansion thereof. This leads to increased variations in thickness and weight precisions. The reduced surface smoothness may also result. Accordingly, the granules of expandable thermoplastic resin, when cylindrically shaped, have diameters preferably in the range of 1 mm–30 mm, most preferably in the range of 2 mm–20 mm.

The height of cylindrically shaped granules of expandable thermoplastic resin is not particularly specified since it depends upon the particular expansion ratio and thickness sought for a target foam. However, if it is excessively increased, an decreased expansion rate may result. On the other hand, if it is excessively reduced, the simultaneous expansion of the granules and thin film may take place to result in increased widthwise and lengthwise expansion thereof. Accordingly, the height of cylindrically shaped granules of expandable thermoplastic resin is preferably in the range of 1 mm–30 mm, most preferably in the range of 2 mm–20 mm.

The spacing between neighboring granules of expandable thermoplastic resin is not particularly specified since it depends upon the particular expansion ratio and thickness sought for a target foam. However, if the spacing is excessively increased, excessively insufficient filling may take place after the expansion of granules of expandable thermoplastic resin. If the spacing is excessively reduced, the area for expansion thereof is reduced to result in a tendency of greater expansion in both width and length directions. Accordingly, the center distance between the neighboring granules of expandable thermoplastic resin is preferably 2 mm–50 mm, most preferably 3 mm–30 mm.

In order to impart to a resulting foam improved thickness precision and weight precision, increased surface smoothness in the third invention, as well as uniformities in both irregularity shape and expansion ratio in the fourth invention, the aforementioned granules of expandable thermoplastic resin must be planarly arranged in a generally uniform fashion in the sheet-form structure of expandable thermoplastic resin. The fashion to arrange the granules of expandable thermoplastic resin planarly in a generally uniform manner is not particularly limited. They may be arranged in a lattice-like fashion as shown in FIG. 2, or alternatively, in a zigzag fashion as shown in FIG. 3. Where the granules of expandable thermoplastic resin are arranged in a lattice-like fashion, the expansion of individual granules of expandable thermoplastic resin results in the formation of square prismatically shaped granular foams excellent in surface smoothness and having increased compressive strength. It is thus favored that the granules of expandable thermoplastic resin are arranged in a lattice-like fashion.

Where the granules of expandable thermoplastic resin are arranged in a zigzag fashion, the expansion of individual granules of expandable thermoplastic resin results in the formation of hexagonal prismatically shaped granular foams which constitute a honeycomb-like structure. The foams obtained are thus imparted thereto the increased surface smoothness and improved compressive strength. It is therefore favored that the granules of expandable thermoplastic resin are arranged in a zigzag fashion.

The thickness of thin film of expandable thermoplastic resin is not particularly specified since it depends upon the particular expansion ratio and thickness sought for a target foam. However, if the thin film is excessively increased in thickness, the granules of expandable thermoplastic resin may be caused to move when foamed to result in the increased expansion in width and length directions. If the thin film is excessively reduced in thickness, it becomes difficult for the film to retain the granules of expandable thermoplastic resin. Accordingly, the thickness of thin film of expandable thermoplastic resin is preferably 0.05 mm–3 mm, most preferably 0.1 mm–2 mm.

Also, the fashion of integrating the granules of expandable thermoplastic resin with the thin film of expandable thermoplastic resin is not particularly limited. In the sheet-form structure 1 of expandable thermoplastic resin, the granules 2 of expandable thermoplastic resin are integrally connected to each other by means of the thin film 3 of expandable thermoplastic resin. In another particular embodiment shown in FIG. 4 by a cross-sectional view, the individual granules 2 of expandable thermoplastic resin are at vertically near-centered portions thereof connected to the thin film 3 of expandable thermoplastic resin for integration. The vertically central portion of granule of expandable thermoplastic resin, as used above, is not necessarily a mid-portion along the height direction thereof, and refers to a portion around a center of gravity of granule of expandable thermoplastic resin.

PLANAR MEMBER

In the first invention of the present application, a planar member is preferably laminated on the aforementioned thin film of expandable thermoplastic resin. The planar member serves to effectively restrain planar expansion of the thin film of expandable thermoplastic resin. This follows that the sheet-form structure of expandable thermoplastic resin, as a whole, can be restrained from expanding in both width and lengthwise directions. It is thus desired to combine a thermoplastic resin containing a blowing agent with the planar member to constitute the thin film of expandable thermoplastic resin.

The material for constituting the aforementioned planar member is not particularly specified, and can be an inorganic woven or nonwoven fabric such as a glass paper or chopped strand mat; an woven or nonwoven fabric of organic fiber such as polypropylene or polyester; a thermoplastic or thermosetting resin sheet; a fiber-reinforced thermoplastic resin sheet; or a metallic sheet.

The inorganic fiber for use in the aforementioned inorganic woven or nonwoven fabric may be a glass or carbon fiber, for example. An excessively high loading of inorganic fibers may result in failure to achieve weight reduction of a resulting foam. On the other hand, an excessively low loading of inorganic fibers may result in failure to restrain expansion of the sheet-form structure of expandable thermoplastic resin. Accordingly, the inorganic woven or nonwoven fabric, if used, has a basis weight preferably of 10–500 g/m$^2$, most preferably of 20–300 g/m$^2$.

The organic fiber for use in the aforementioned organic woven or nonwoven fabric may be a polypropylene, polyester, nylon, or aramid fiber, for example. An excessively high loading of organic fibers may result in failure to achieve weight reduction of a resulting foam. On the other hand, an excessively low loading of organic fibers may result in failure to restrain expansion of the sheet-form structure of expandable thermoplastic resin. Accordingly, the organic woven or nonwoven fabric, if used, has a basis weight preferably of 10–500 g/m$^2$, most preferably of 20–300 g/m$^2$.

The thermoplastic resin for use in the aforementioned thermoplastic resin sheet is not particularly specified, and may be polyethylene, polypropylene, or polyethylene terephthalate, for example. In order for the thermoplastic resin sheet to exhibit increased adhesion to the sheet-form structure of expandable thermoplastic resin, the thermoplastic resin sheet, for use as the planar member, is preferably formed of a thermoplastic resin which is same in type as the thermoplastic resin used in the manufacture of sheet-form structure.

The thermosetting resin for use in the aforementioned thermosetting resin sheet is not particularly specified, and may be melamine resin, phenol resin, epoxy resin or unsaturated polyester, for example.

Examples of metals for use in the aforementioned metallic sheet include aluminum and iron.

The aforementioned sheet comprised of thermoplastic resin, fiber-reinforced thermoplastic resin, thermosetting resin or metal, if made excessively thick, fails to achieve the contemplated weight reduction of a resulting foam. On the other hand, if made excessively thin, the sheet fails to restrain expansion of the sheet-form structure of expandable thermoplastic resin. Accordingly, the sheet has a thickness preferably in the range of 0.05–1 mm, most preferably in the range of 0.1–0.5 mm.

Examples of fibers for use in the aforementioned fiber-reinforced thermoplastic resin sheet include inorganic fibers such as glass and carbon fibers; organic fibers such as polypropylene, polyester, nylon and aramid fibers; and metallic fibers. These fibers may be employed in the form of woven or nonwoven fabric. Also, the thermoplastic resin for use in the aforementioned fiber-reinforced thermoplastic resin sheet is not particularly specified, and may be polyethylene, polypropylene, or polyethylene terephthalate, for example. In order to provide increased adhesion between the above sheet and the sheet-form structure of expandable thermoplastic resin, the thermoplastic resin may preferably be employed which is of the same type as the thermoplastic resin used for the manufacture of the sheet-form structure.

If the fiber-reinforced thermoplastic resin sheet formed by combining any of these fibers with a thermoplastic resin is excessively;increased in weight, the contemplated reduction in weight of a resulting foam fails. On the other hand, if the sheet is excessively decreased in weight, its ability to restrain expansion of the sheet-form structure of expandable thermoplastic resin may be lost. Accordingly, the fiber-reinforced thermoplastic resin sheet has a basis weight preferably in the range of 10–500 g/m$^2$, most preferably in the range of 20–300 g/m$^2$.

The fiber content of the fiber-reinforced thermoplastic resin sheet is preferably in the range of 10–70 parts by weight, most preferably in the range of 30–60 parts by weight, based on 100 parts by weight of thermoplastic resin. The fiber content of less than 10 parts by weight may become insufficient for the combined fibers to provide a desired reinforcing effect. On the other hand, if the fiber content exceeds 70 parts by weight, it may become difficult for the fibers to be combined with the thermoplastic resin to unity. The insufficient adhesion of the resin sheet to the sheet-form structure of expandable thermoplastic resin may also result.

METHOD OF MANUFACTURING THE SHEET-FORM STRUCTURE OF EXPANDABLE THERMOPLASTIC RESIN

A method of manufacturing the sheet-form structure of expandable thermoplastic resin of the first invention is not particularly specified, and can be exemplified by the following method. 1) a method in which a thermoplastic resin, a blowing agent and the others as required for constituting the sheet-form structure of expandable thermoplastic resin are fed into an injection molding machine for melt mixing at a temperature of lower than a decomposition temperature of the heat-decomposable blowing agent, and the melt is injected into a mold having recesses corresponding in shape to the granule of expandable thermoplastic resin and subsequently cooled. However, most preferred is the following method. 2) the method as recited in claim 7 wherein a thermoplastic resin, a blowing agent and the others as required for constituting the sheet-form structure of expandable thermoplastic resin are fed into an extruder for melt mixing at a temperature of lower than a decomposition temperature of the heat-decomposable blowing agent, a subsequently extruded, sheet-form, expandable thermoplastic resin, while in a softened state, is introduced between a pair of counterrotating shaping rolls which define therebetween a clearance of a dimension less than a thickness of the sheet-form, expandable thermoplastic resin and at least one of which has an outer surface provided with a number of uniformly arranged recesses, a portion of the sheet-form, expandable thermoplastic resin while in a softened state is compressively forced into the recesses, and the sheet-form resin is cooled and released.

METHOD IN ACCORDANCE WITH THE SECOND INVENTION FOR MANUFACTURING THE SHEET-FORM STRUCTURE OF EXPANDABLE THERMOPLASTIC RESIN

As stated above, the method by which the sheet-form structure of expandable thermoplastic resin according to the first invention can be manufactured is not particularly limited. It is however preferable to employ the method according to the second invention, as will be described later, for the manufacture of the sheet-form structure of expandable thermoplastic resin according to the first invention.

First, a sheet-form, expandable thermoplastic resin in a softened state is obtained by generally employing a technique which utilizes an extruder for melt mixing an expandable thermoplastic resin therein and subsequently extruding therefrom, or a technique which utilizes calender rolls for melting an expandable thermoplastic resin. The technique utilizing the extruder is most preferred in terms of continuous weight precision and metering characteristics.

The form of expandable thermoplastic resin in a softened state is not particularly limited, so far as it is continuously fabricable. The form may be a sheet or multi-strand form, for example. However, the sheet form is most preferred which enables precise metering in a direction perpendicular to flow (in a cross direction).

The recesses provided on the outer surface of shaping roll are preferably arranged in a generally uniform fashion, in order to obtain improved characteristics in weight and thickness precisions of a resulting sheet-form structure of expandable thermoplastic resin. The arrangement of recesses on the outer surface of shaping roll is not particularly specified, so far as it is made in a generally uniform manner over a whole area of the outer surface of shaping roll. It is most preferred, however, that those recesses are provided in a more uniform fashion, i.e., in a lattice-like or zigzag fashion.

The shape of recesses provided on the outer surface of shaping roll is not particularly limited, and may be hexahedral, cylindrical or spherical, for example. Most preferred, however, is the cylindrical shape which facilitates fabrication of recesses, uniform molding of granules of expandable thermoplastic resin, and releasing of a resulting foam therefrom after cooled.

The diameter of cylindrical recesses, if so shaped on the peripheral surface of shaping roll, is not particularly specified, since it varies depending upon the particular configuration sought for a target sheet-form structure of expandable thermoplastic resin. However, the excessively increased diameter presents difficulties in releasing a cooled foam from a mold, and may also cause breakage of the thin film of expandable thermoplastic resin. The excessively reduced diameter may cause breakage of granules of expandable thermoplastic resin during a releasing process subsequent to cooling. Accordingly, the diameter is preferably 1 mm–30 mm, most preferably 2 mm–20 mm.

The height of cylinders, if so shaped to define the recesses on the peripheral surface of shaping roll, is not particularly specified, since it varies depending upon the particular configuration of a target sheet-form structure of expandable thermoplastic resin. However, the excessively increased height presents difficulties in releasing a cooled foam from a mold, and may also cause breakage of the thin film of expandable thermoplastic resin. The excessively reduced height may result in failure to form the one-dimensionally expansible, sheet-form structure of expandable thermoplastic resin. Accordingly, the height is preferably 1 mm–30 mm, most preferably 2 mm–20 mm.

The clearance defined between the pair of shaping rolls must be dimensioned to be smaller than a thickness of sheet-form structure of expandable thermoplastic resin while in a softened state. The clearance, if comes within this range, is not particularly specified, since it varies depending upon the particular configuration of a target sheet-form structure of expandable thermoplastic resin. However, the excessively increased clearance may result in failure to form the one-dimensionally expansible, sheet-form structure of expandable thermoplastic resin. The excessively reduced clearance may cause breakage of thin film of expandable thermoplastic resin during a releasing process subsequent to cooling. Accordingly, the clearance is dimensioned to be preferably 0.05 mm–3 mm, most preferably 0.1 mm–2 mm.

As the sheet-form, expandable thermoplastic resin, while in a softened state, is introduced between the pair of shaping rolls, a pressure is applied thereto from the shaping rolls with their clearance being maintained unvaried, so that portions thereof can be compressively forced into the recesses.

The technique of cooling the sheet-form, expandable thermoplastic resin in a softened state, portions of which have been compressively forced into the recesses for shaping thereof, is not particularly limited, so far as it is capable of cooling the resin to a temperature of not greater than a melting point of expandable thermoplastic resin. For example, a cooling water may be allowed to flow interior of the shaping rolls.

The specific procedure for practicing the method of manufacturing the sheet-form structure of expandable thermoplastic resin is now described with reference to FIG. 5. A thermoplastic resin, a heat-decomposable blowing agent and the others required for constituting an expandable thermoplastic resin sheet are fed into an extruder 11 shown in FIG. 5(*a*), melt mixed at a temperature of lower than a decomposition temperature of the heat-decomposable blowing agent, and subsequently extruded into a sheet form from a die 12. The extruded, sheet-form expandable thermoplastic resin, while in a softened state, is introduced between the shaping rolls 13, 14, which respectively have recesses 13*a* corresponding in shape to the granules of expandable thermoplastic resin and maintain a clearance therebetween, for concurrent cooling and shaping thereof. Consequently, a sheet-form structure of expandable thermoplastic resin is obtained which is configured such that pillar-like projections defined by the granules 2 of expandable thermoplastic resin protrude from one surface of the thin film 3 of expandable thermoplastic resin.

In the case where the individual granules of expandable thermoplastic resin are at vertically near-centered portions thereof connected to each other through the thin film of expandable thermoplastic resin, a pair of shaping rolls 13, 13 shown in FIG. 5(*b*) may be employed which respectively have recesses 13*a*, 13*a* corresponding in shape to the granules of expandable thermoplastic resin.

In the case where the sheet-form structure of expandable thermoplastic resin incorporates the thin film of expandable thermoplastic resin which is comprised of a thermoplastic resin containing a blowing agent and a planar member, as stated earlier, a technique 1) utilizing the procedures shown in FIG. 5(*a*) may be employed to fabricate the sheet-form structure of expandable thermoplastic resin which is subsequently heat fused to the planar member. Preferred, however, is a technique 2), as illustrated in FIG. 6(*a*), wherein, while the sheet-form, expandable thermoplastic resin is shaped by a combination of a shaping roll 13 having recesses 13*a* corresponding in shape to the granules of expandable thermoplastic resin and a shaping roll 14, the planar member is introduced on the shaping roll 14, so that the sheet-form, expandable thermoplastic resin is shaped while the thin film of expandable thermoplastic resin is united with the planar member.

In the above-described case where the individual granules of expandable thermoplastic resin are at vertically near-centered portions thereof connected to each other through the thin film of expandable thermoplastic resin, and where the thin film of expandable thermoplastic resin is comprised of a thermoplastic resin containing a blowing agent and a planar member, two of the sheet-form expandable thermoplastic resin in a softened state are fed to interpose therebetween the planar member, as shown in FIG. 6(b), in the above technique 2). In this instance, the pair of useful shaping rolls 13, 13 may be respectively configured to have recesses 13a, 13a corresponding in shape to the granules of expandable thermoplastic resin.

THERMOPLASTIC RESIN FOAM

The thermoplastic resin foams in accordance with the third and fourth inventions of the present application are thermoplastic resin foams which can be manufactured by foaming the sheet-form structure of expandable thermoplastic resin of the first invention.

That is, as the sheet-form structure of expandable thermoplastic resin is subjected to foaming, the granular portions of expandable thermoplastic resin are duly foamed. In this instance, an outer surface of each granule of expandable thermoplastic resin is hard to retain therein bubbles produced during foaming to result in the formation of a slightly-expanded thin film which exhibits a reduced expansion ratio compared to an interior portion of the granule. As the interior portion of the granule proceeds to expand, such a slightly-expanded thin film is allowed to get closer to a slightly-expanded thin film of a neighboring granule, so that they are generally heat fused to each other. This results in such a state that the slightly-expanded thin film covers an outer surface of the highly-expanded portion defined interior of granule, and generally in such a state that a number of highly-expanded portions are heat fused to each other through the slightly-expanded thin films.

In a particular aspect of the fourth invention, the selection of particular foaming and cooling conditions sometimes leads to. the construction wherein highly-expanded portions, as covered with respective slightly-expanded thin films, are spaced from each other but are integrally connected through a continuous foam layer.

Also, the thin film of expandable thermoplastic resin, which serves to connect the granules of expandable thermoplastic resin in the sheet-form structure of expandable thermoplastic resin, becomes a continuous foam layer which places thereon a number of highly-expanded portions. This continuous foam layer is too thin to retain bubbles therein, and is accordingly a slightly-expanded layer.

As stated above, the thermoplastic resin foams in accordance with the third and fourth inventions are thermoplastic resin foams, respectively, which can be manufactured by foaming the sheet-form structure of expandable thermoplastic resin of the first invention.

However, the thermoplastic resin foams in accordance with the third and fourth inventions are not limited to those thermoplastic resin foams manufactured by foaming the sheet-form structure of expandable thermoplastic resin of the first invention.

The thermoplastic resin foams of the third and fourth inventions are below described in detail.

THERMOPLASTIC RESINS FOR USE IN THERMOPLASTIC RESIN FOAMS

The thermoplastic resins for use in the continuous foam layer, slightly-expanded thin film and highly-expanded portions, which together constitute the aforementioned thermoplastic resin foam, are not particularly specified. Applicable thermoplastic resins include those for use in the thin film and granules of expandable thermoplastic resin in the first invention, for example. Among these thermoplastic resins, preferred are polyolefin resins such as polyethylene and polypropylene, and mixtures thereof, which are capable of imparting increased surface smoothness to a resulting foam in the third invention, as well as facilitating the formation of irregularities in the fourth invention. Particularly preferred are high-density polyethylene, homopolypropylene, and mixtures containing at least one of these, which are effective not only to reconcile the surface smoothness and compressive strength in the third invention but also to provide increased compressive strength in the fourth invention.

The thermoplastic resin for use in the aforementioned continuous foam layer and the thermoplastic resin for use in the slightly-expanded thin film and highly-expanded portions may not necessarily be of the same type. However, the use of the same type of resins provides strong fusion-bonds and an improved flexural strength.

The thermoplastic resins respectively for use in the slightly-expanded thin film and for use in the highly-expanded portions are preferably identical to each other. In the event the thermoplastic resin foam is manufactured by foaming the sheet-form structure of expandable thermoplastic resin of the first invention, they are comprised of the same resin.

The thermoplastic resin for use in the aforementioned thermoplastic resin foam may be crosslinked, if necessary. The use of crosslinked thermoplastic resin is preferred for its ability to impart improved stability in heat resistance to the thermoplastic resin foam.

In the case where the thermoplastic resin for use in the aforementioned thermoplastic resin foam comprises the above-described mixture of mutually substantially incompatible, highly-crosslinked composition (A) and slightly-crosslinked or uncrosslinked composition (B), the slightly-crosslinked composition, when foamed, is allowed to flow so that the enhanced fusion bonds between neighboring highly-expanded portions can be provided through the respective slightly-expanded thin films. This is suited to impart improved flexural strength and increased surface smoothness to a resulting thermoplastic resin foam in the third invention, and also to reduce the occurrence of fractures in the irregularly-formed thermoplastic resin foam, when load is applied thereto, in a particular aspect of the fourth invention.

The thermoplastic resin for use in the aforementioned thermoplastic resin foam may incorporate, as necessary, a reinforcing material such as a glass, carbon or polyester short fiber; or a filler such as calcium carbonate, aluminum hydroxide or glass powders. The incorporation thereof imparts increased compressive strength and/or flexural strength to the thermoplastic resin foam in the third invention, and which imparts improved flexural strength to the thermoplastic resin foam in the fourth invention.

CONFIGURATION OF THERMOPLASTIC RESIN FOAM

The configuration of thermoplastic resin foam in accordance with the third invention is below explained by taking as an example a thermoplastic resin foam shown in FIG. 9.

As shown in FIG. 9, a thermoplastic resin foam 4 includes a continuous foam layer 4c comprised of thermoplastic resin and having at least one surface on which a number of highly-expanded portions 4a comprised of thermoplastic resin and having high expansion ratios are provided. A slightly-expanded thin film 4b comprised of thermoplastic resin and having a low expansion ratio covers an outer surface of the respective highly-expanded portion 4a. The neighboring highly-expanded portions 4a are heat fused to each other through the respective, slightly-expanded thin films 4b.

As stated earlier, such a thermoplastic resin foam can be manufactured by foaming the sheet-form structure of expandable thermoplastic resin in accordance with the first invention. The thin film of expandable thermoplastic resin (indicated by 3 in FIG. 1), which serves to integrally connect the granules of expandable thermoplastic resin, now takes the form of continuous foam layer 4c. Each granule of expandable thermoplastic resin, when foamed, defines the slightly-expanded thin film 4b at its outer surface, as well as the highly-expanded portion 4a interior thereof. The neighboring slightly-expanded thin films 4b are heat fused to unity. As a consequence, the slightly-expanded thin films 4b cover the outer surfaces of the respective highly-expanded portions 4a for integral connection thereof.

The configuration of thermoplastic resin foam in a particular aspect of the fourth invention is explained with reference to FIG. 10.

As shown in FIG. 10, a thermoplastic resin foam 4A includes a continuous foam layer 4c comprised of thermoplastic resin and having one surface on which a number of highly-expanded portions 4a comprised of thermoplastic resin and having high expansion ratios are provided. A slightly-expanded thin film 4b comprised of thermoplastic resin and having a low expansion ratio covers a peripheral surface of each highly-expanded portion 4a. The neighboring highly-expanded portions 4a are spaced from each other but integrally connected though the continuous foam layer 4c. The continuous foam layer 4c has projected portions between the neighboring highly-expanded portions 4a to define irregularities.

Although shown as being irregularly-formed between the neighboring highly-expanded portions 4a, each covered with the respective slightly-expanded thin film 4b, in FIG. 10, those portions of the continuous foam layer 4a may be flat.

An essential feature of the thermoplastic resin foam 4A in accordance with the fourth invention resides in the formation of irregularities on its lower surface, i.e., its surface located on a side where the highly-expanded portions 4a are uncovered with the continuous foam layer 4c is irregularly formed in such a manner as to define concedes at the highly-expanded portions 4a, covered with respective slightly-expanded thin films 4b, and concaves at portions between neighboring highly-expanded portions 4a.

FIG. 11 is a cross-sectional view showing another example of thermoplastic resin foam in accordance with the fourth invention. This thermoplastic resin foam 4B includes a continuous foam layer 4c comprised of thermoplastic resin and having one surface on which a number of highly-expanded portions 4a comprised of thermoplastic resin and having high expansion ratios are provided. A slightly-expanded thin film 4b comprised of thermoplastic resin and having a lower expansion ratio covers an outer surfaces of the respective highly-expanded portion 4a. Furthermore, the neighboring highly-expanded portions 4a are heat fused to each other through the respective slightly-expanded portions 4b. The foregoings are similar with the thermoplastic resin foam 4 shown in FIG. 9.

FIG. 12 is a sectional view showing still another example of thermoplastic resin foam in accordance with the fourth invention. This thermoplastic resin foam 4D has a number of concaves 4d on its upper surface. The others are similar in construction with the thermoplastic resin foam 4B shown in FIG. 11. That is, the thermoplastic resin foam 4D has an irregularly-formed lower surface, i.e., its surface, located on a side where the highly-expanded portions 4a are covered with respective slightly-expanded thin films 4b but uncovered with the continuous foam layer 4c, is irregularly formed in such a manner as to define concedes at the highly-expanded portions 4a covered with respective slightly-expanded thin films 4b and concaves at portions between neighboring highly-expanded portions 4a. On the other hand, the upper surface of the thermoplastic resin foam 4D, i.e., the surface located on a side covered with the continuous foam layer 4c defines a number of concaves 4d at portions thereof respectively corresponding in location to the highly-expanded portions 4a.

In the thermoplastic resin foam in accordance with the fourth invention, the height of convex on the aforementioned irregular surface, i.e., on the foam surface located on a side uncovered with the continuous foam layer 4c, is at least 1 mm, preferably at least 2 mm, more preferably at least 3 mm, thereby providing an improved cushioning effect. The height of convex refers to a dimension of its discontinuous portion.

Preferably, the thermoplastic resin foam in accordance with the fourth invention is configured so that a packing ratio, i.e., a proportion in volume of a circumscribing rectangular parallelepiped that is occupied by the circumscribed thermoplastic resin foam, comes within the range of 50–90%. More specifically, the packing ratio, as used herein, refers to a proportion in volume of a circumscribing rectangular parallelepiped K, shown by a broken line in FIG. 11, that is occupied by the circumscribed thermoplastic resin foam. The increased packing ratio means the reduction in magnitude of irregularity. As the packing ratio falls below 50%, the magnitude of irregularity increases excessively, making it difficult to consistently obtain the irregularly-surfaced thermoplastic resin foams. The attempt to obtain a sufficient compressive strength may also fail. As the packing ratio goes beyond 90%, the magnitude of irregularity decreases to such an extent that a satisfactory cushioning effect may not be obtained.

The overall configuration of the thermoplastic resin foams in accordance with the third and fourth inventions is generally a sheet or plate form.

In the thermoplastic resin foams in accordance with the third and fourth inventions, the reduced expansion ratio of slightly-expanded thin films causes reduction in flexibility of thermoplastic resin foam, as well as increase in thermal conductivity of thermoplastic resin foam which adversely affects its thermal insulation properties. On the other hand, the increased expansion ratio thereof may result in failure to obtain a thermoplastic resin foam having a high degree of compressive strength. Accordingly, the expansion ratio of slightly-expanded thin films is preferably 1.1–10, more preferably 1.2–7, still more preferably 1.2–5.

The increased thickness of slightly-expanded thin film may result in failure to achieve the contemplated reduction in weight of thermoplastic resin foam. On the other hand, the reduced thickness thereof may result in failure to obtain a thermoplastic resin foam having a high degree of compressive strength. Accordingly, the thickness of slightly-expanded thin film is preferably 30 $\mu$m–500 $\mu$m, more preferably 40 $\mu$m–400 $\mu$m, still more preferably 50 $\mu$m–400 $\mu$m.

The thickness of slightly-expanded thin film may not necessarily be uniform, and may be non-uniform. The thickness of slightly-expanded thin film, as termed herein, refers to an average thickness of slightly-expanded thin film along a cross-section of the thermoplastic resin foam.

In the third and fourth inventions, where the slightly-expanded thin film has an expansion ratio of 1.1–10 and a thickness of 30 $\mu$m–500 $\mu$m, the compressive strength and lightweight properties of thermoplastic resin foam can be better reconciled. The above-specified ranges are thus preferred. More preferably, the slightly-expanded thin film has an expansion ratio of 1.2–7 and a thickness of 40 $\mu$m–400 $\mu$m. Still more preferably, it has an expansion ratio of 1.2–5 and a thickness of 50 $\mu$m–400 $\mu$m.

The reduced expansion ratio of highly-expanded portion leads to the increased difficulty in achieving the contemplated reduction in weight of thermoplastic resin foam, and also to the increased thermal conductivity of thermoplastic resin foam which accordingly decreases the thermal insulation properties of a resultant shaped foam. On the other hand, the increased expansion ratio thereof results not only in failure to obtain high degrees of compressive strength and/or flexural strength in the third invention, but also in failure to obtain an irregularly-surfaced thermoplastic resin foam having a high degree of compressive strength in the fourth invention. Accordingly, the expansion ratio of highly-expanded portion is preferably 2–100, more preferably 5–50, still more preferably 10–35.

The increased size of highly-expanded portion leads to the reduced compressive and/or flexural strengths of a resultant thermoplastic resin foam in the third invention, and to the reduced flexural strength of a resultant, irregularly-surfaced foam in the fourth invention. On the other hand, the reduced size thereof leads to the increased difficulty in achieving the contemplated reduction in weight of a resultant thermoplastic resin foam. Accordingly, the size of highly-expanded portion is preferably 3–50 mm, more preferably 5–30 mm.

The size of highly-expanded portion may not necessarily be uniform, and may be non-uniform. The size of highly-expanded portion, as termed herein, refers to a maximum value in size when measured along its cross-sectional direction.

In general, the expansion ratio of slightly-expanded thin film does not exceed a half of that of highly-expanded portion.

The reduced expansion ratio of continuous foam layer leads to the increased difficulty in achieving the contemplated reduction in weight of a resultant thermoplastic resin foam, while the increased expansion ratio thereof results in failure to obtain a thermoplastic resin having a high degree of flexural strength. Accordingly, the expansion ratio of continuous foam layer is preferably 1.1–10, more preferably 2–8, still more preferably 2–7.

The increased thickness of continuous foam layer gives rise to the failure to achieve the contemplated reduction in weight of thermoplastic resin foam. On the other hand, the reduced thickness thereof results not only in failure to obtain the thermoplastic resin foam having high degrees of compressive and/or flexural strengths in the third invention, but also in failure to obtain the irregularly-surfaced, thermoplastic resin foam having a high degree of compressive strength in the fourth invention. Accordingly, the thickness of continuous foam layer is preferably 100 $\mu$m–5 mm, more preferably 300 $\mu$m–3 mm, still more preferably 500 $\mu$m–2 mm.

The thickness of continous foam layer may not necessarily be uniform, and may be non-uniform. The thickness of continous foam layer, as termed herein, refers to an average thickness of continous foam layer along a direction of longitudinal-section of the thermoplastic resin foam.

In the thermoplastic resin foams 4, 4A, 4B, and 4D respectively shown in FIGS. 9 through 12, the highly-expanded portions 4a are joined solely to one surface of the continuous foam layer 4c as a substantially single layer in a thickness direction (one-dimensionally). Also in the thermoplastic resin foams 4, 4B and 4D, the highly-expanded portions 4a are heat-fused to each other along a cross-section (two-dimensionally) through the slightly-expanded thin films 4b which are respectively continuous along a thickness direction of the thermoplastic resin foam to form a truss-like structure. This structure serves to further improve the compressive strength of thermoplastic resin foam and reduces variations in compressive strength thereof.

As described above, when desired to accomplish the improvement in both thickness and weight precisions of thermoplastic resin foam, as well as the reduced variation in flexural strength, it is preferred that a number of highly-expanded portions are planarly arranged in a generally uniform fashion along a cross-section of the foam. The manner to planarly arrange the highly-expanded portions in a generally uniform fashion is not particularly specified. They may be arranged in a lattice-like fashion, as shown in FIG. 13, or in a zigzag fashion, as shown in FIG. 14.

The individual, highly-expanded portions 4a, when arranged in a lattice-like fashion, assume a preferred form of rectangular prism, as shown in FIG. 13, which form is effective not only in imparting increased surface smoothness and compressive strength to a thermoplastic resin foam in the third invention, but also in imparting more uniform cushioning effect, as well as an increased flexural strength, to an irregularly-surfaced thermoplastic resin foam in the fourth invention.

The individual, highly-expanded portions 4a, when arranged in a zigzag fashion, assume another preferred form of hexagonal prism, as shown in FIG. 14, and are heat fused to each other through respective slightly-expanded thin films 4b to form a thermoplastic resin foam having a honeycomb-like structure as a whole. Such a honeycomb-like thermoplastic resin foam is preferred for its ability, in the third invention, to constitute the thermoplastic resin foam which is excellent in surface smoothness, especially in compressive and/or flexural strengths, and, in the fourth invention, to constitute the irregularly-surfaced, thermoplastic resin foam which exhibits a uniform cushioning effect and is excellent in compressive strength.

In the thermoplastic resin foam in accordance with the third invention, the highly-expanded portions are provided preferably on opposite surfaces of the continuous foam layer. On each surface, they are arranged in such a manner not to vertically overlap each other and to vertically define a single layer, and are laterally fused to each other through the respective slightly-expanded thin films. An example of the thermoplastic resin foam such constructed is shown in FIG. 15. As shown in FIG. 15, the highly-expanded portions 4a are provided on opposite surfaces of the continuous foam layer 4c, and arranged on each surface in such a manner not to vertically overlap each other and to vertically define a single layer. In addition, the highly-expanded portions 4a are, in both length and width directions (two-dimensionally), heat fused to each other through the respective slightly-expanded thin films 4b. The thermoplastic resin foam thus constructed is allowed to have top and bottom surfaces having the same degree of surface smoothness.

Also in the thermoplastic resin foams in accordance with the third and fourth inventions, a planar member may preferably be laminated onto the continuous foam layer of thermoplastic resin foam. In such an instance, the planar member serves to reinforce the continuous foam layer and allows the highly-expanded portions to be joined more strongly to the continuous foam layer, resulting in the formation of thermoplastic resin foam which is particularly excellent in flexural strength.

The material for constituting the above planar member is not particularly specified, and the planar member used in the first invention can be employed.

METHOD OF MANUFACTURING A THERMOPLASTIC RESIN FOAM

Although not considered as limiting, the aforementioned thermoplastic resin foam of the third invention can be manufactured preferably by utilizing the method of the fifth invention, as described below, to foam the sheet-form structure of expandable thermoplastic resin in accordance with the first invention.

For example, the thermoplastic resin foam of the third invention can be manufactured by foaming pellets of expandable thermoplastic resin containing a blowing agent to thereby form highly-expanded portions heat fused to each other through respective slightly-expanded thin films, and heat fusing thereto a separately fabricated, continuous foam layer.

METHOD OF THE FIFTH INVENTION FOR MANUFACTURING A THERMOPLASTIC RESIN FOAM

In accordance with the fifth invention of the present application, the aforementioned sheet-form structure of expandable thermoplastic resin is heated to a temperature sufficient to decompose a blowing agent to effect foaming thereof, followed by cooling of the sheet-form structure thus foamed. In applying heat in the above foaming process, any suitable technique can be employed which is capable of heating the sheet of expandable thermoplastic resin to a temperature sufficient to decompose the heat-decomposable blowing agent contained in the granules of expandable thermoplastic resin. For example, a technique which utilizes an electrical heater, a far-infrared heater, or the other type of heater constructed to circulate a heating medium such as a heated oil or air can be employed to heat the sheet structure.

Also, a technique of cooling the aforementioned foam is not particularly specified, and thus any technique can be employed which is capable of cooling the foam to a temperature equal to or lower than a softening point of a constituent thermoplastic resin. For example, a cooling technique can be employed which utilizes a cooling unit configured to circulate a cooling medium such as a cooled water or air.

In a case where the method of manufacturing a thermoplastic resin foam, according to the fifth invention, is selected to manufacture the irregularly-surfaced, thermoplastic resin foam of the fourth invention, a cooling unit is preferably employed which is configured to provide a space more than sufficient to fully accommodate the sheet-form structure of expandable thermoplastic resin, while foamed to expand, to leave a clearance therebetween. This facilitates the formation of irregularly-surfaced, thermoplastic resin foam according to the fourth invention.

The aforementioned cooling unit is not particularly specified, so far as it is configured to provide a space more than sufficient to fully accommodate the sheet-form structure of expandable thermoplastic resin while foamed to expand to leave a clearance therebetween. Any type of cooling unit can be employed which is suitably constructed to cool the foam to a temperature not exceeding a softening point of a constituent thermoplastic resin. For example, a cooling unit of the type circulating a cooling medium such as a cooled water or air can be employed.

As stated above, the cooling unit is configured to provide a space more than sufficient to fully accommodate the sheet-form structure of expandable thermoplastic resin while foamed to expand to leave a clearance therebetween. For example, if a bottom surface of an imaginary rectangular parallelepiped, which is completely filled with the sheet-form structure of expandable thermoplastic resin while foamed to expand, is brought into contact with the cooling unit, a top surface of the rectangular parallelepiped will be vertically spaced from an opposing surface of the cooling unit. The clearance as termed above is a dimension of this vertical spacing. The clearance can be calculated from the expansion ratio and weight of sheet-form structure of expandable thermoplastic resin, and the others.

The excessively increased clearance may cause a whole structure of the irregularly-surfaced, thermoplastic resin foam to surge to a greater degree. Accordingly, the clearance is preferably up to 10 mm, more preferably up to 5 mm, still more preferably up to 3 mm, on the basis of a volume of the aforementioned rectangular parallelepiped completely filled with the sheet-form structure of expandable thermoplastic resin while foamed to expand. Such volume can be calculated from the expansion ratio and weight of sheet-form structure of expandable thermoplastic resin, and the others.

EFFECTS

In the sheet-form structure of expandable thermoplastic resin according to the first invention, the granules of expandable thermoplastic resin are planarly arranged in a generally uniform fashion, and integrally connected to each other through the thin film of expandable thermoplastic resin. Accordingly, as shown in FIGS. 7(a) and 7(b), at an early stage after heated to a temperature sufficient to decompose the blowing agent, only the thin film 3 of expandable thermoplastic resin having a lower heat capacity is foamed, while the granules 2 of expandable thermoplastic resin having a higher heat capacity is left unfoamed, at an early stage. In this instance, the thin film 3' of expandable thermoplastic resin, when foamed, is restrained from expand in a planar direction due to the presence of unfoamed granules 2 of expandable thermoplastic resin. This not only causes the thin film 3 to surge at portions between the neighboring granules 2 of expandable thermoplastic resin, but also reduces the expansion ratio thereof. As shown in FIGS. 7(c), 8(a) and 8(b), the foaming of thin film 2 of expandable thermoplastic resin is followed by the foaming of the granules 2 of expandable thermoplastic resin which expand to fill the spaces between the neighboring granules 2 to individually become foamed granules 2'. A sheet-form thermoplastic resin foam 4a can thus be obtained by effecting the pseudo-one-dimensional expansion of sheet-form structure 1 of expandable thermoplastic resin, while restraining the planar expansion thereof.

Also, in the case where the granules of expandable thermoplastic resin are planarly arranged in a lattice-like fashion, the individual granules of expandable thermoplastic resin, when foamed, take the form of rectangular prism. In addition to effectively provide reduced variations in both thickness and weight precisions of a resultant thermoplastic resin foam, this facilitates the formation of thermoplastic resin foam, in the third invention, which is excellent in surface smoothness and compressive strength, as well as facilitating the formation of irregularly-surfaced thermoplastic resin foam, in the fourth invention, which is excellent in cushioning properties and compressive strength.

In the alternative case where the granules of expandable thermoplastic resin are planarly arranged in a zigzag fashion, the individual granules of expandable thermoplastic resin, when foamed, take the form of hexagonal prism, resulting in the formation of a foam having an overall form of honeycomb. In addition to effectively provide reduced variations in both thickness and weight precisions of a resultant thermoplastic resin foam, this facilitates the formation of thermoplastic resin foam, in the third invention, which is excellent in surface smoothness, particularly in compressive and flexural strengths, as well as facilitating the formation of irregularly-surfaced thermoplastic resin foam, in the fourth invention, which is uniform in cushioning properties and excellent in compressive strength.

Where the granules of expandable thermoplastic resin are at vertically near-centered portions thereof connected to the thin film of expandable thermoplastic resin, the same level of surface smoothness can be imparted to top and bottom surfaces of a resulting thermoplastic resin foam. Consequently, the thermoplastic resin foam having excellent surface smoothness can be obtained.

The planar member, when laminated onto the thermoplastic resin sheet, serves to effectively restrain the thin film of expandable thermoplastic resin from expanding in a planar direction thereof. Accordingly, the distance between the neighboring granules of expandable thermoplastic resin is maintained substantially unvaried during the foaming process to thereby permit the more effective pseudo-one-dimensional foaming.

In the case where the granules of expandable thermoplastic resin comprise a mixture of a blowing agent, and mutually substantially incompatible, highly-crosslinked thermoplastic resin composition and slightly-crosslinked or uncrosslinked thermoplastic resin composition, the slightly-crosslinked or uncrosslinked thermoplastic resin composition, when foamed, exhibits a shear flow which facilitates the pseudo-one-dimensional foaming. In addition, this facilitates the formation of thermoplastic resin foam, in the third invention, which is excellent in surface smoothness and further has increased compressive strength resulting from the uniform foaming of granules of expandable thermoplastic resin, as well as facilitating the formation of irregularly-surfaced, thermoplastic resin foam, in the fourth invention, which is excellent in cushioning properties and compressive strength.

In accordance with the second invention, the sheet-form expandable thermoplastic resin is introduced between a pair of shaping rolls, as stated earlier, to compressively force portions of sheet-form expandable thermoplastic resin, while in a softened state, into recesses provided on the shaping rolls, prior to cooling thereof. This facilitates the formation of the aforementioned sheet-form structure of expandable thermoplastic resin.

In the thermoplastic resin foam in accordance with the third invention, the highly-expanded portions 4a are heat fused to the continuous foam layer 4c comprised of thermoplastic resin, as shown in FIG. 9. The outer surfaces of the highly-expanded portions 4a, left unfused to the continuous foam layer, are covered with the respective slightly-expanded thin films 4b composed of thermoplastic resin, so that the highly-expanded portions 4a, respectively composed of thermoplastic resin, are heat fused to each other through the respective slightly-expanded thin films 4b. This construction serves to impart increased compressive strength to the thermoplastic resin foam. In addition, since the continuous foam layer is heat fused to the individual highly-expanded portions in a manner to successively connect them, no separation or fracture will take place at fusion interfaces between the neighboring slightly-expanded. thin films to assure a high degree of flexural strength. of the thermoplastic resin foam.

In the thermoplastic resin foam in accordance with the fourth intention, as shown in FIGS. 10–12, the highly-expanded portions 4a are heat fused to the continuous foam layer 4c comprised of thermoplastic resin, and the outer surfaces thereof left unfused to the continuous foam layer are covered with the respective slightly-expanded thin films 4b. The highly-expanded portions 4a comprised of thermoplastic resin are integrally connected to each other through the continuous foam layer, or heat fused to each other directly through the respective slightly-expanded thin films 4b or through portions of the continuous foam layer. Accordingly, the increased flexural strength can be imparted thereto, analogously to the thermoplastic resin foam in accordance with the third invention. Furthermore, in the constructions shown in FIGS. 11 and 12, the continuous foam layer 4c is heat fused to the highly-expanded portions 4a in a manner as to successively connect the highly-expanded portions 4a. This prevents the occurrence of separation or fracture at fusion interfaces between the neighboring slightly-expanded thin films 4b.

Also, in the thermoplastic resin foam in accordance with the fourth invention, at least one surface thereof, i.e., the surface which is located on a side uncovered with the continuous foam layer 4c, or on a side where the highly-expanded portions have protruding outer surfaces covered with the respective slightly-expanded thin films 4b, is irregularly formed in such a manner as to define concedes at the highly-expanded portions and concaves at portions between neighboring highly-expanded portions. Accordingly, such a thermoplastic resin foam, when subjected to impact, exhibits the excellent cushioning properties.

In the third invention, as well as in a particular aspect of the fourth invention, the highly-expanded portions are provided on only one surface of the continuous foam layer in such a fashion that they are vertically fused to the continuous foam layer as a substantially single layer, and planarly (two-dimensionally) fused to each other through the respective slightly-expanded thin films. Accordingly, the highly-expanded portions respectively uniform in a thickness direction of the thermoplastic resin, and the slightly-expanded thin films 4b respectively continuous in the thickness direction of thermoplastic resin foam, together establish a truss-like structure which provides improved compressive strength as well as reduced variation in compressive strength of the thermoplastic resin foam.

In the third invention, the highly-expanded portions, if provided on respective surfaces of the continuous foam layer, are arranged substantially as a single layer in a thickness direction (one-dimensionally), and heat fused to each other in a planar direction (two-dimensionally) through the respective slightly-expanded thin films, so that the same degree of surface smoothness can be imparted to the respective surfaces of thermoplastic resin foam. The thermoplastic resin foam can thus be obtained which is excellent in surface smoothness.

In the thermoplastic resin foams in accordance with the third and fourth inventions, the individual highly-expanded portions, if arranged in a lattice-like fashion, take the form of rectangular prism, resulting in the provision of thermoplastic resin foam which exhibits the reduced variations in both thickness and weight precisions, which is excellent in either surface smoothness or cushioning properties, and which has an increased compressive strength.

In the third invention, as well as in a particular aspect of the fourth invention, the highly-expanded portions, if arranged in a zigzag fashion, take the form of hexagonal prism, and are heat fused to each other through the respective slightly-expanded thin films, so that the thermoplastic resin foam having an overall form of honeycomb can be obtained. Accordingly, the thermoplastic resin foam can be obtained in the third invention which has an improved surface smoothness and is particularly excellent in compressive and flexural strengths. The irregularly-surfaced, thermoplastic resin foam can also be obtained in the fourth invention which is excellent in both compressive strength and cushioning properties.

In the thermoplastic resin foam in accordance with the third invention, the planar member, when laminated onto the thermoplastic resin foam, serves to reinforce the continuous foam layer at strength so that the highly-expanded portions can be more strongly joined to the continuous foam layer, resulting in the provision of the thermoplastic resin foam particularly excellent in flexural strength.

In accordance with the fifth invention, the thermoplastic resin foam, according to the third invention, can be manufactured which exhibits reduced variations in thickness and weight precisions and is excellent in surface smoothness, which has an increased compressive strength and exhibits a reduced variation in strength, and which is sufficient in flexural strength. The irregularly-surfaced, thermoplastic resin foam, according to the fourth invention, can also be manufactured which exhibits reduced variations in thickness and weight precisions, which has an increased compressive strength and exhibits a reduced variation in strength, and which exhibits excellent cushioning properties against the action of impact.

BEST MODES FOR CARRYING OUT THE INVENTIONS

The effects of the present inventions are now clarified by the following non-limiting Examples and Comparative Examples.

MANUFACTURE OF SHEET-FORM STRUCTURE OF EXPANDABLE THERMOPLASTIC RESIN (1)

EXAMPLES 1–7, 11–14

Figure 1:
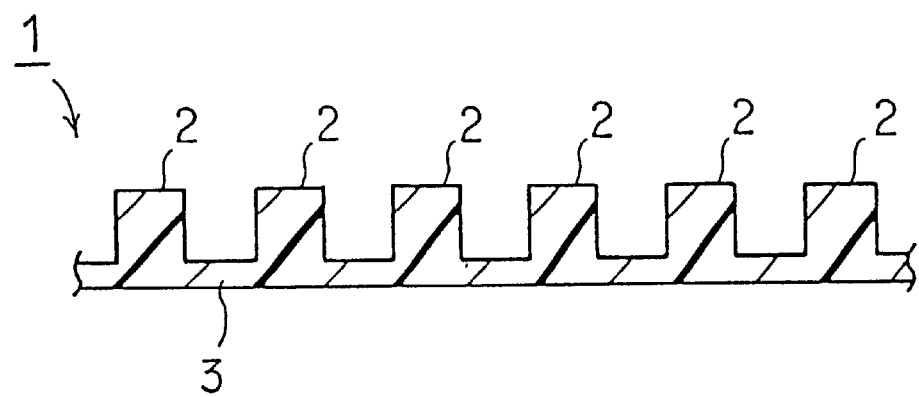
FIG. 1 is a fragmentary sectional view illustrating one embodiment of a sheet-form structure of expandable thermoplastic resin of the present invention.
Figure 2:
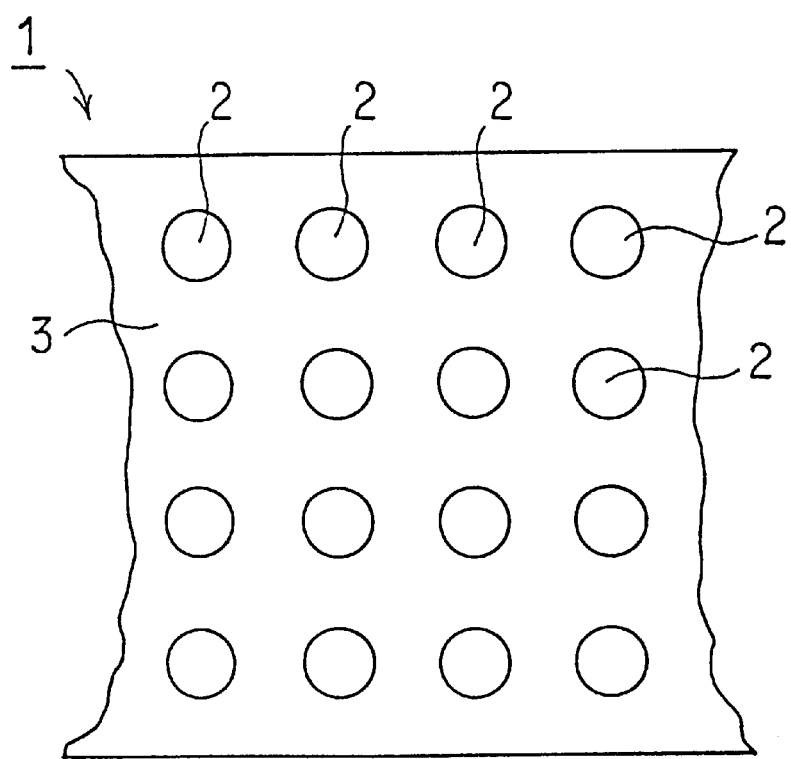
FIG. 2 is a plan view of a sheet-form structure of expandable thermoplastic resin, illustrating granules of expandable thermoplastic resin arranged in a lattice-like pattern.
Figure 3:
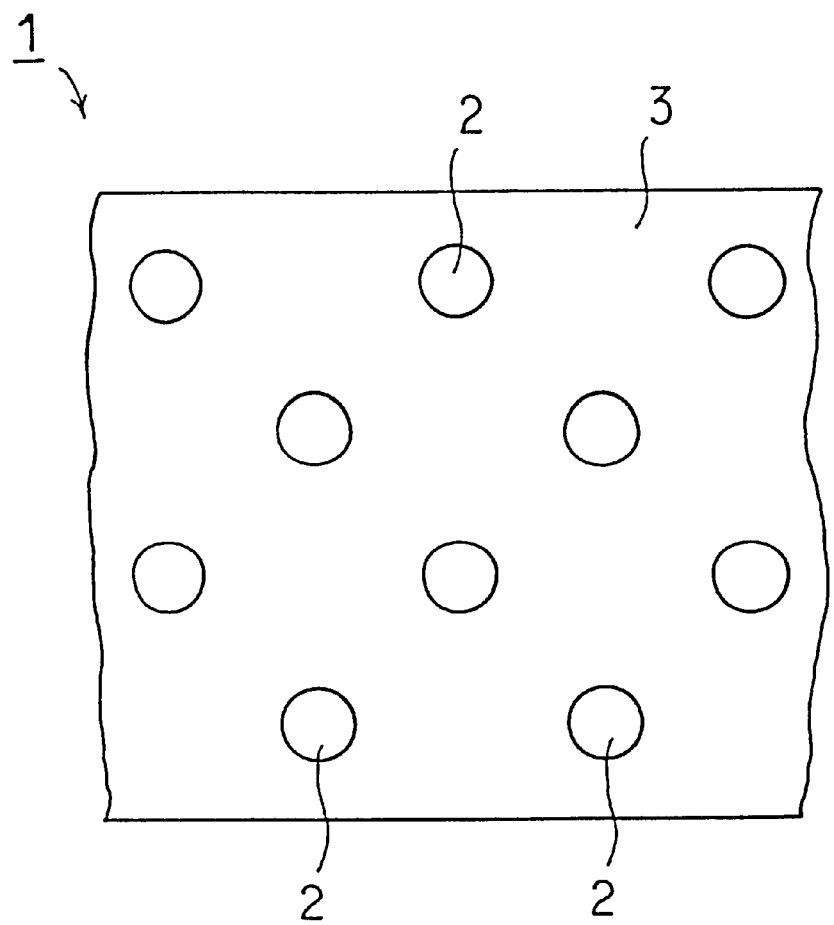
FIG. 3 is a plan view of a sheet-form structure of expandable thermoplastic resin, illustrating granules of expandable thermoplastic resin arranged in a zigzag pattern.
Figure 4:
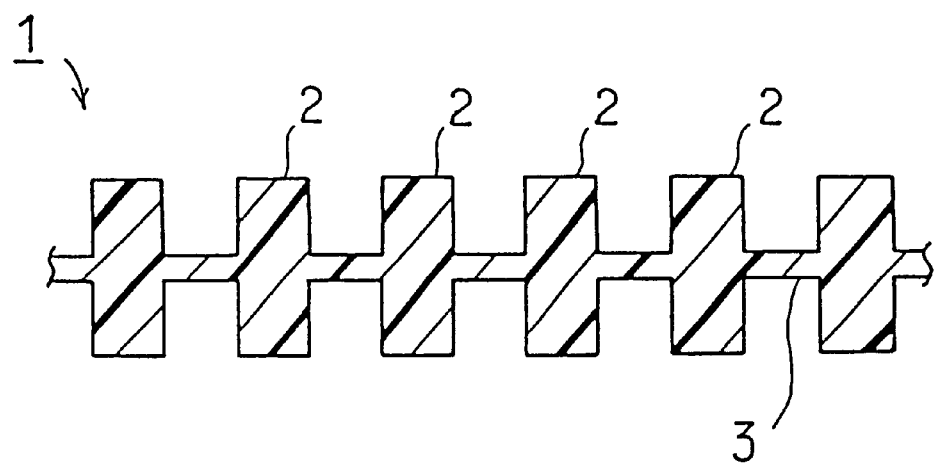
FIG. 4 is a fragmentary sectional view of a sheet-form structure of expandable thermoplastic resin, illustrating granules of expandable thermoplastic resin which are centrally in their height direction connected to a thin film of expandable thermoplastic resin.
Figure 5:
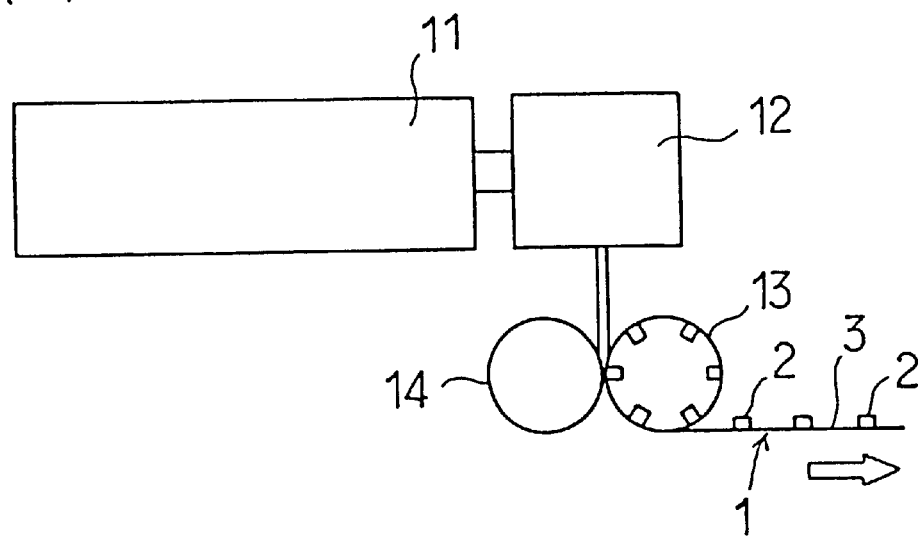
FIG. 5($a$) is a schematic side view illustrating a process of manufacturing a sheet-form structure of expandable thermoplastic resin of the present invention, while ($b$) is an enlarged sectional view of a main part of the process shown in ($a$), illustrating a step of forming granules of expandable thermoplastic resin.
Figure 5:
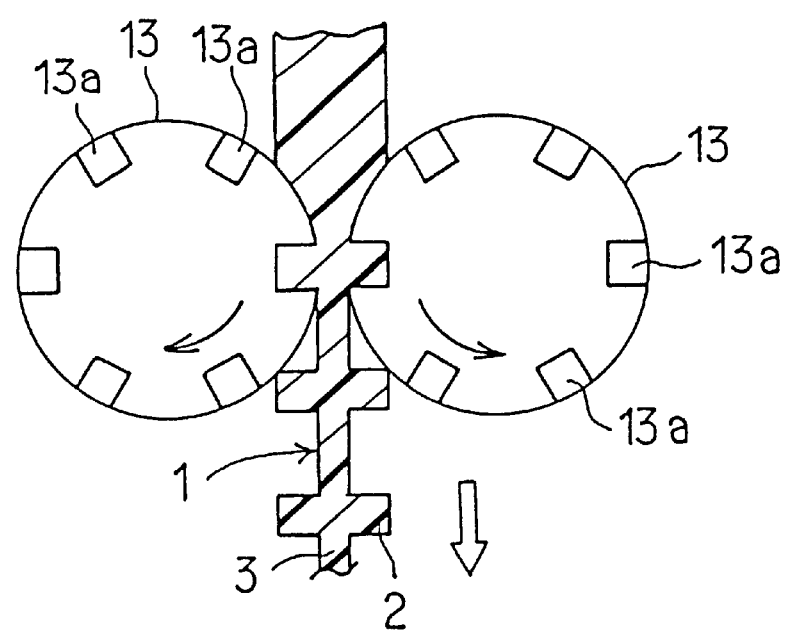

A composition containing a thermoplastic resin in the proportion (parts.by weight) shown in Tables 1 and 2, 0.1 parts by weight of dibutyltin dilaurate, as a catalyst for silane-crosslinking, and 5 parts by weight of azodicarbonamide (manufactured by Otsuka Chemical Co., product name: SO-20, decomposition temperature of 210° C.), as a heat-decomposable blowing agent, was fed to a twin-screw extruder 11, as shown in FIG. 5, which had a diameter of 44 mm. The above-specified composition was melt mixed in the twin-screw extruder 11 at 180° C., and was then extruded from a T-die 12 having a face length of 500 mm and a lip of 1.0 mm to produce a sheet-form expandable thermoplastic resin in a softened state.

The sheet-form expandable thermoplastic resin was introduced between a pair of rolls 13, 14 or a pair of rolls 13, 13, with recesses being provided in rolls 13 in a fashion as indicated in Tables 1 and 2, each having a diameter of 250 mm and a face length of 500 mm, to concurrently shape and cool the sheet-form expandable thermoplastic resin which was subsequently immersed in water at 98° C. for 2 hours and dried. As a consequence, a sheet-form structure 1 of expandable thermoplastic resin having a configuration indicated in Tables 1 and 2 was obtained.

EXAMPLES 8–10 and 15

Figure 6:
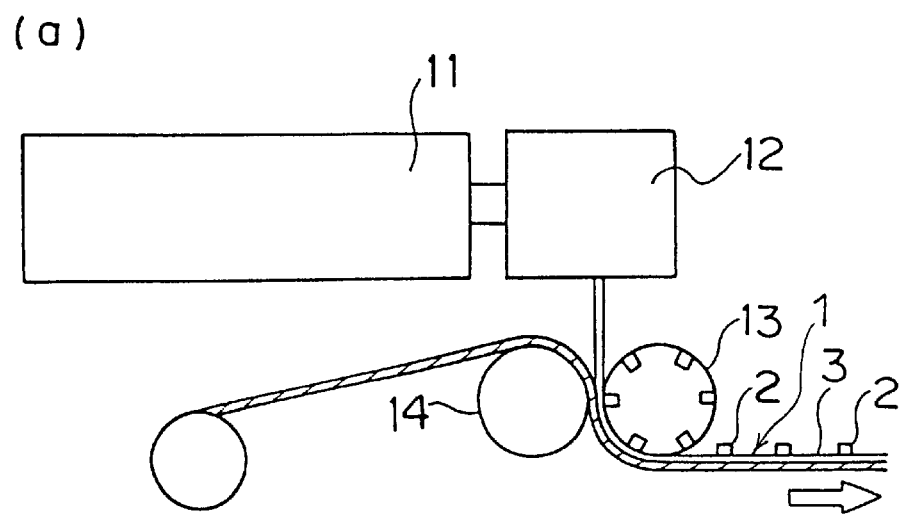
FIG. 6 illustrates a process of fabricating a thin film of expandable thermoplastic resin, in a sheet-form structure of expandable thermoplastic resin, which is comprised of a thermoplastic resin containing a blowing agent and a planar member, and ($a$) illustrates a process when the thin film of expandable thermoplastic resin in the sheet-form structure of expandable thermoplastic resin shown in FIG. 1 is comprised of the thermoplastic resin and the planar member, while ($b$) is a schematic side view illustrating a process, analogous to ($a$), in case of the sheet-form structure of expandable thermoplastic resin shown in FIG. 4.
Figure 6:
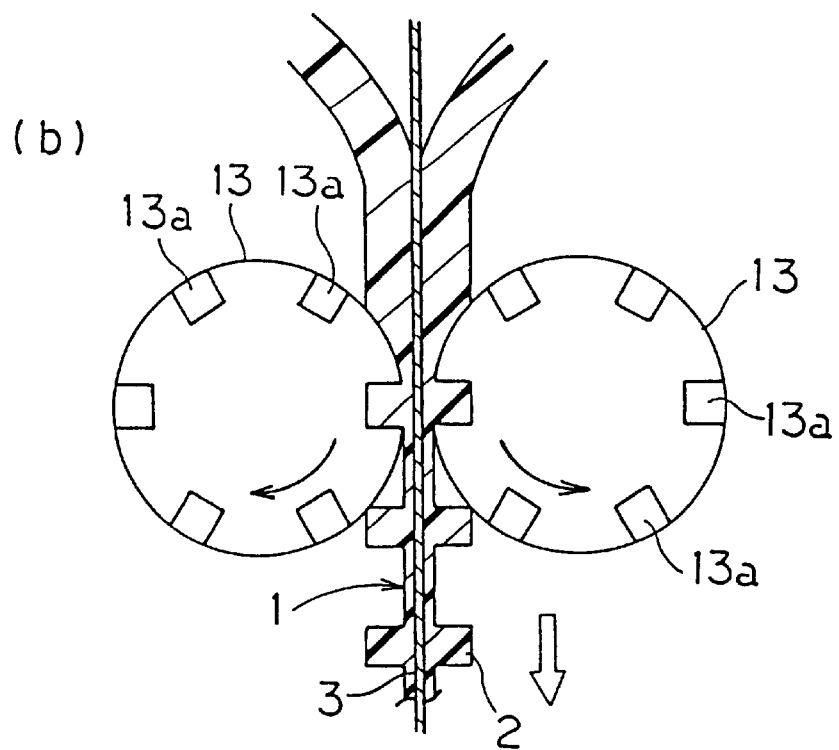

A sheet-form expandable thermoplastic resin in a softened state was extruded from a T-die 12 in the same manner as in Example 1 by utilizing a composition containing a thermoplastic resin in the indicated parts by weight in Tables 1 and 2, 0.1 parts by weight of dibutyltin dilaurate, as a catalyst for silane-crosslinking, and 5 parts by weight of azodicarbonamide (manufactured by Otsuka Chemical Co., product name: SO-20, decomposition temperature of 210° C.), as a heat-decomposable blowing agent. The sheet-form expandable thermoplastic resin extruded from the T-die 12, while in a softened state, was introduced between a pair of rolls 13, 14 or a pair of shaping rolls 13, 13, with recesses being provided in the rolls 13 in a fashion as indicated in Tables 1 and 2, each having a diameter of 250 mm and a face length of 500 mm, to shape the sheet-form expandable thermoplastic resin which was concurrently combined with a glass paper (manufactured by Olivest Co., product name: FVP 045, 45 g/m$^2$), as a planar member, according to the process shown in FIG. 6(a) or 6(b), and subsequently cooled. The sheet-form structure of expandable thermoplastic resin thus shaped was then immersed in water at 98° C. for 2 hours. As a consequence, the sheet-form structure 1 (glass paper is not shown) of expandable thermoplastic resin having a configuration indicated in Tables 1 and 2 was obtained.

EXAMPLE 16

The procedure of Example 15 was followed, except that 10 parts by weight of azodicarbonamide was incorporated, to obtain a sheet-form structure of expandable thermoplastic resin as analogous to that obtained in Example 15. A foam was further obtained.

The foam had a thickness of 20 mm, a thickness variation of 0.3 mm, pseudo-one-dimensional expandability of 1.00, compressive strength variation of 0.06 kgf/cm$^2$, and flexural strength of 4.12 kgf/cm$^2$, and exhibited good surface profile and smoothness.

CONFIGURATIONS AND OTHERS OF SHEET-FORM STRUCTURES OF EXPANDABLE THERMOPLASTIC RESIN OF EXAMPLES 1–16

In the sheet-form structures of expandable thermoplastic resin of Examples 1–16 obtained in the manner as stated above, each sheet-form structure successfully defined granules of expandable thermoplastic resin at its portions having corresponded in location to the recesses on the aforementioned shaping roll 13. The granules of expandable thermoplastic resin were integrally connected to each other through a thin film of expandable thermoplastic resin, which together constituted the sheet-form structure of expandable thermoplastic resin.

Each of the sheet-form structures of expandable thermoplastic resin obtained in a manner as stated above was subjected to evaluations. The shape, height and diameter of granules of expandable thermoplastic resin, center distance between neighboring granules, thickness of a thin film of expandable thermoplastic resin, joint region of the thin film relative to the granules of expandable thermoplastic resin, and presence of a planar member are respectively reported in Tables 1 and 2 which follow.

The height of granule of expandable thermoplastic resin, as termed hereinabove, refers to a vertical dimension of the granule plus a thickness of the thin film of expandable thermoplastic resin, if the granule is at its one vertical end connected to the thin film, and refers to a distance between vertically opposite ends of the granule, if the granule is centrally connected to the thin film of expandable thermoplastic resin.

By indicating the joint region of the thin film of expandable thermoplastic resin as being an end, it is meant that the individual granule of expandable thermoplastic resin is at its one vertical end connected to the thin film of expandable thermoplastic resin.

COMPARATIVE EXAMPLE 1

A composition containing a thermoplastic resin in the indicated parts by weight in Table 2, 0.1 parts by weight of dibutyltin dilaurate, as a catalyst for silane-crosslinking, and 5 parts by weight of azodicarbonamide (manufactured by Otsuka Chemical Co., product name: SO-20, decomposition temperature of 210° C.), as a heat-decomposable blowing agent, was fed to the twin-screw extruder 11 in the same manner as in Example 1, and extruded from the T-die 12 into a sheet form in the same manner as in Example 1. The sheet extruded from the T-die 12 was then cooled by introducing the sheet between a pair of rolls, each having a diameter of 250 mm and a face length of 500 mm and with no recess on its surface. The sheet thus cooled was then immersed in water at 98° C. for 2 hours and subsequently dried to obtain a flat sheet of expandable thermoplastic resin having a thickness of 1.0 mm.

COMPARATIVE EXAMPLE 2

A composition containing a thermoplastic resin in the indicated parts by weight in Table 2, 0.1 parts by weight of dibutyltin dilaurate, as a catalyst for silane-crosslinking, and 5 parts by weight of azodicarbonamide (manufactured by Otsuka Chemical Co., product name: SO-20, decomposition temperature of 210° C.), as a heat-decomposable blowing agent, was fed to the twin-screw extruder 11 in the same manner as in Example 1, and extruded from the T-die 12 into a sheet form. The sheet thus extruded was then cooled by introducing the sheet between a pair of rolls, each having a diameter of 250 mm and a face length of 500 mm and with no recess on its surface. The sheet thus cooled was then pelletized, immersed in water at 98° C. for 2 hours, and subsequently dried to obtain 5×5 mm, 1.5 mm thick pellets of expandable thermoplastic resin.

MANUFACTURE OF THERMOPLASTIC RESIN FOAMS (1)

Figure 7:
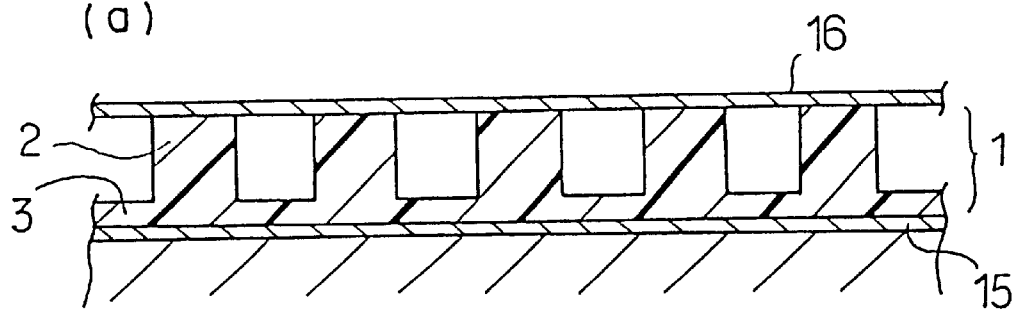
FIGS. 7($a$)–($c$) are sectional views, respectively, illustrating respective steps for foaming a sheet-form structure of expandable thermoplastic resin of the present invention.
Figure 7:
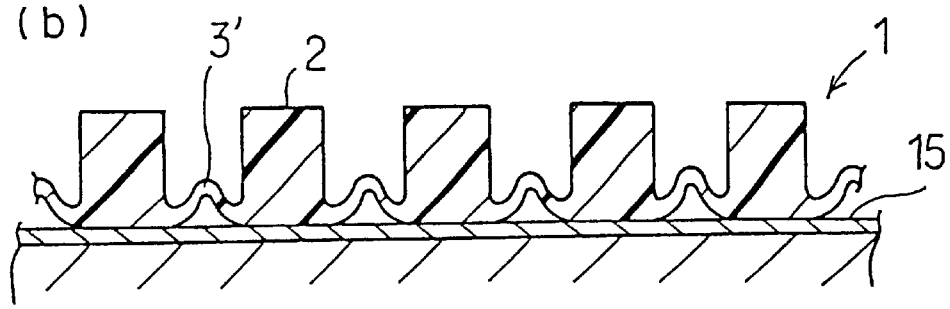
Figure 7:
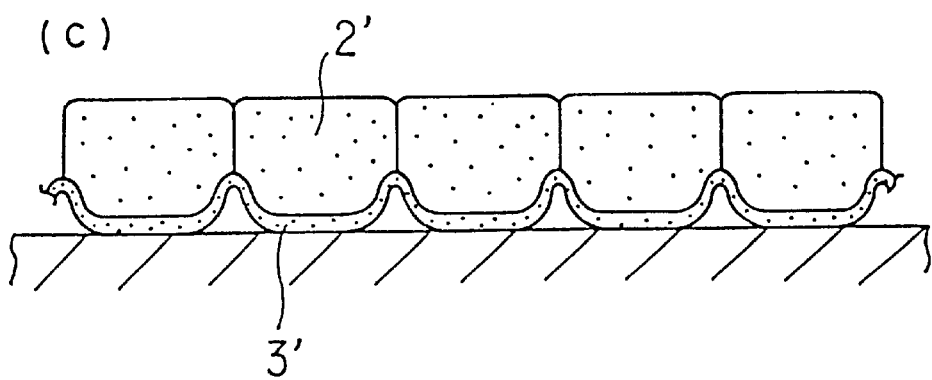
Figure 8:
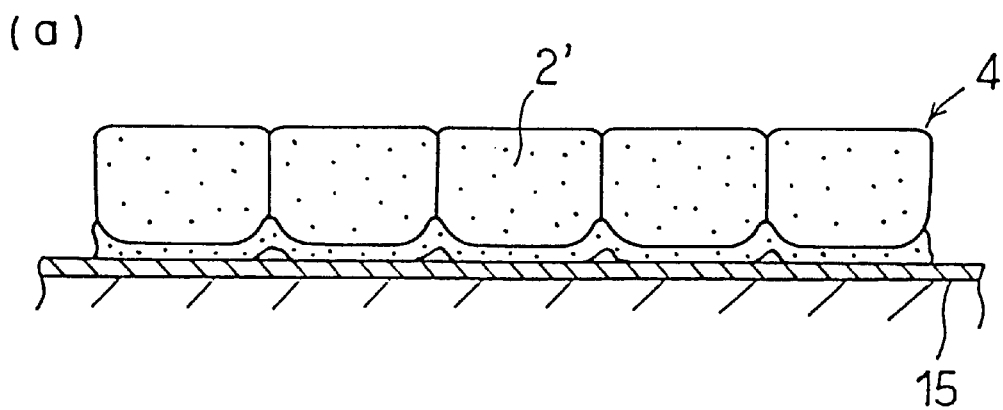
FIG. 8($a$) and ($b$) are sectional view, respectively, illustrating a step of foaming a sheet-form structure of expandable thermoplastic resin to obtain a foam.
Figure 8:
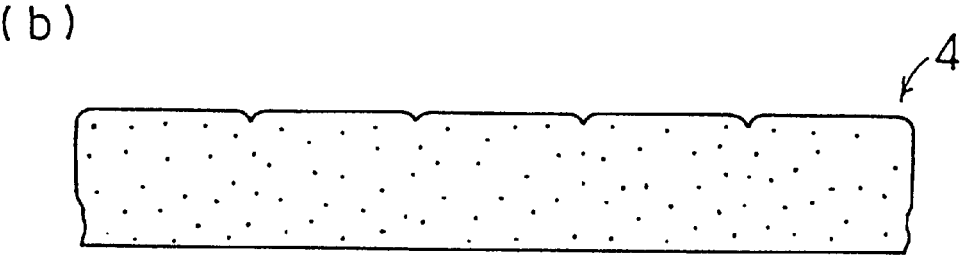
Figure 9:
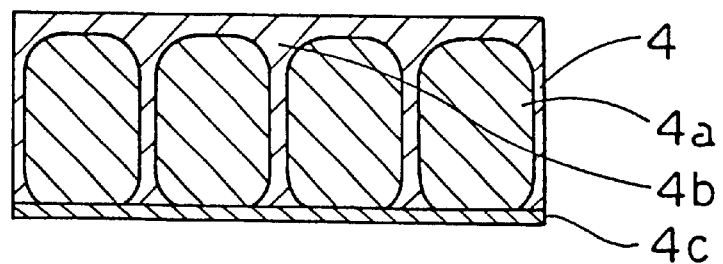
FIG. 9 is a schematic longitudinal section showing one example of a thermoplastic resin foam of the present invention.
Figure 10:
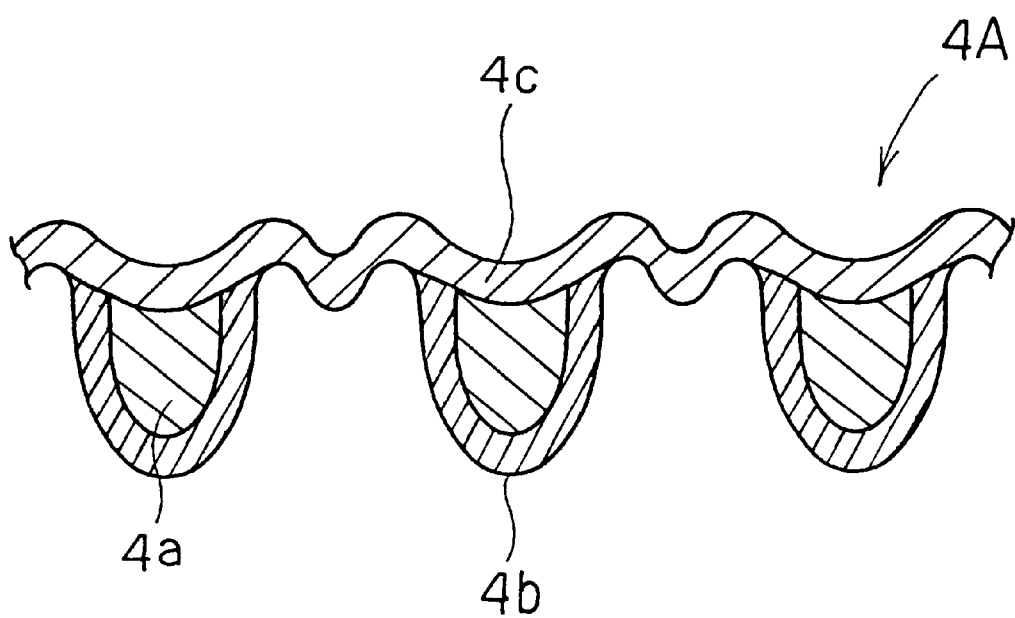
FIG. 10 is a schematic longitudinal section showing another example of a thermoplastic resin foam of the present invention.
Figure 11:
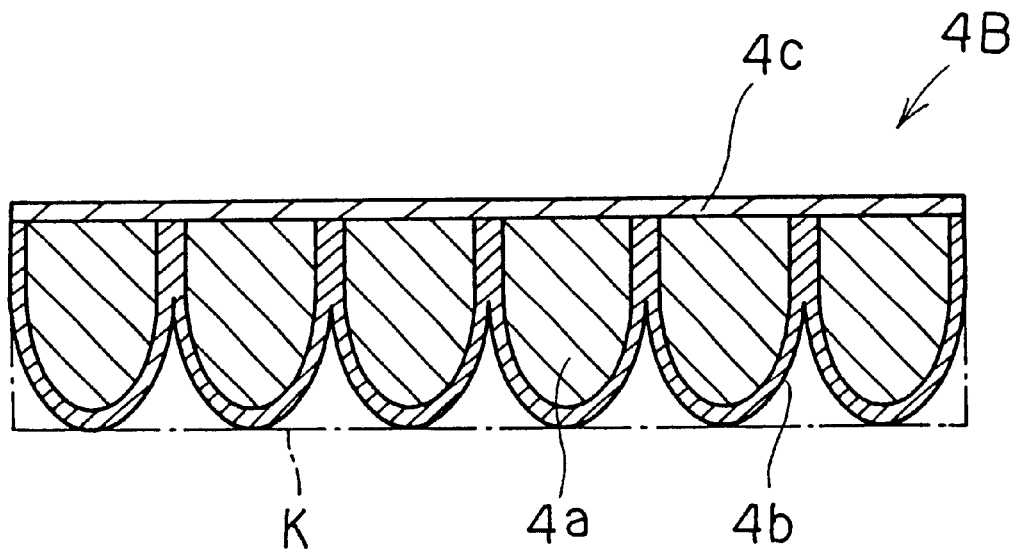
FIG. 11 is a schematic longitudinal section showing still another example of a thermoplastic resin foam of the present invention.
Figure 12:
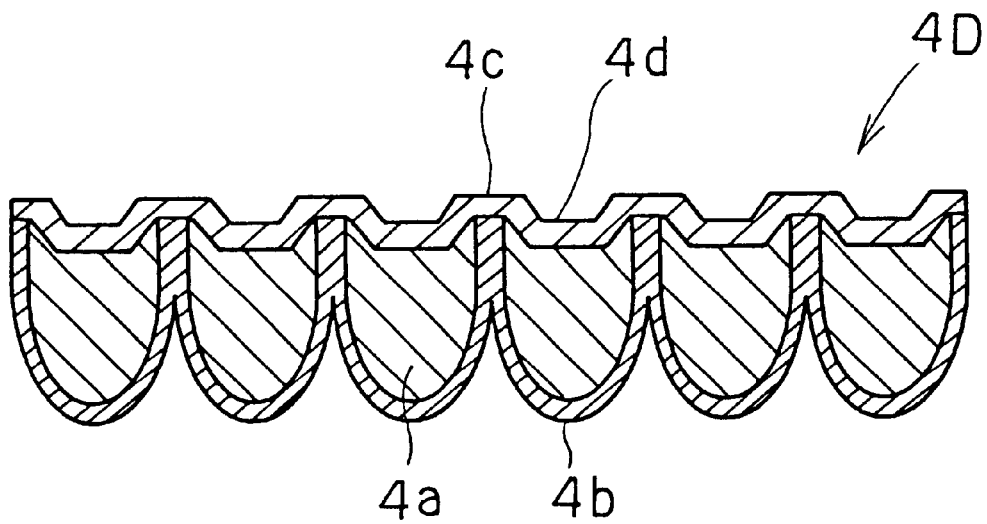
FIG. 12 is a schematic longitudinal section showing still another example of a thermoplastic resin foam in accordance with the present invention.
Figure 13:
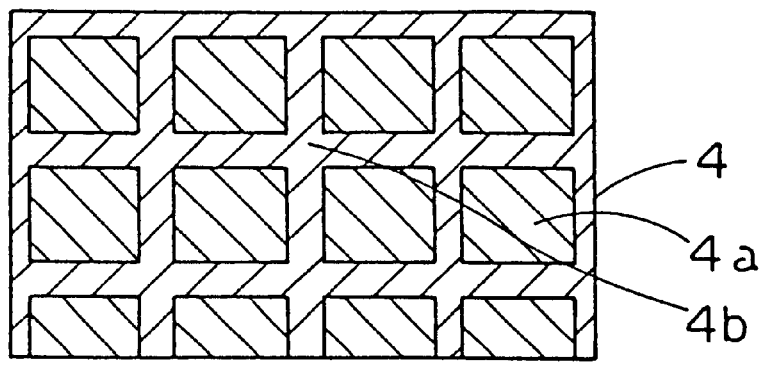
FIG. 13 is a schematic transverse section showing an example of thermoplastic resin foam of the present invention in which highly-expanded portions are arranged in a lattice-like pattern.
Figure 14:
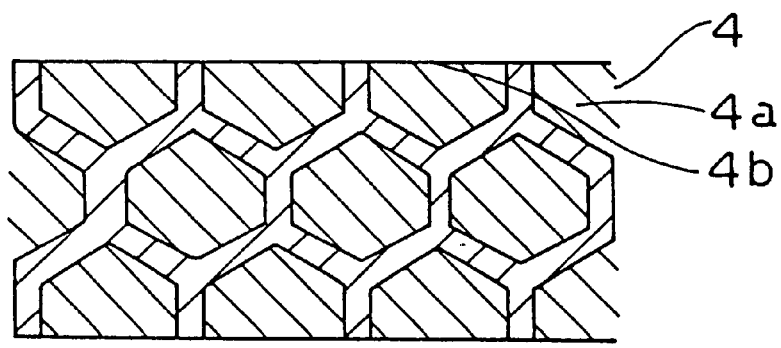
FIG. 14 is a schematic transverse section showing an example of thermoplastic resin foam of the present invention in which highly-expanded portions are arranged in a zigzag pattern.
Figure 15:
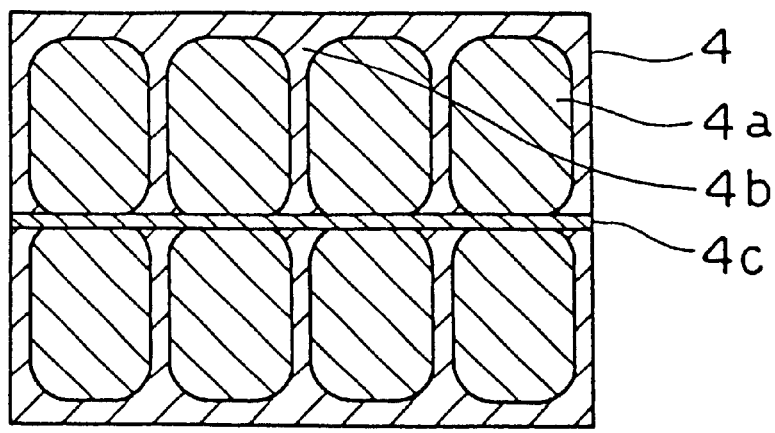
FIG. 15 is a schematic longitudinal section showing another example of thermoplastic resin foam of the present invention.

In Examples 1–15, and Comparative Example 1, the expandable thermoplastic resin sheet 1 obtained in the manner as described above, measuring the weight as indicated in Tables 1 and 2, was placed on a fluoroethylene resin sheet 15, as shown in FIG. 7(a). Subsequent to further placement of another fluoroethylene sheet 16, the stack was heated for 10 minutes by using a 210° C. handpress to foam the sheet, and subsequently transferred to a 30° C. cooling press to cool the sheet for 10 minutes. As a result, a thermoplastic resin foam was obtained.

On the other hand, in Comparative Example 2, the pellets of expandable thermoplastic resin, instead of the flat sheet of expandable thermoplastic resin, were spread for dispersion on the fluoroethylene sheet 15 so as to measure a weight of 1000 g/m². The succeeding procedures were carried out in the same manner as above to obtain a thermoplastic resin foam.

EVALUATION (1)

The thermoplastic resin foams obtained were measured, according to the following procedures, for expansion ratio, thickness and its variation, pseudo-one-dimensional expandability, 25% compressive strength and its variation, flexural strength, top and bottom surface appearances, and surface smoothness. The measured results are given in the following Tables 1 and 2.

(EXPANSION RATIO)

The expansion ratio was measured according to JIS K6767.

(THICKNESS OF FOAM)

The thickness of foam obtained was measured by using a vernier caliper.

(THICKNESS VARIATION OF FOAM)

The difference between maximum and minimum values of the foam thickness, when n=20, was measured to give the thickness variation.

(PSEUDO-ONE-DIMENSIONAL EXPANDABILITY)

The area of expandable thermoplastic resin sheet before foamed, as well as the area of resultant thermoplastic resin foam, were measured respectively. The ratio of the former to the latter was calculated to give the pseudo-one-dimensional expandability. The value closer to 1 indicates an increased pseudo-one-dimensional expandability.

(25% COMPRESSIVE STRENGTH)

The 25% compressive strength was measured according to JIS K6767.

(VARIATION OF COMPRESSIVE STRENGTH)

The difference between maximum and minimum values of 25% compressive strength, when n=10, was measured to give the variation.

(FLEXURAL STRENGTH)

Cutting or laminating was performed to form a 150 mm×20 mm×6 mm thermoplastic resin foam which was then subjected to three-point bending test under the specific conditions, i.e., span of 90 mm, press speed of 20 mm/min, press axis radius R=5, and n=5, for measurement of flexural strength.

(TOP AND BOTTOM SURFACE APPEARANCES)

The top and bottom surface appearances of resultant thermoplastic resin foam were organoleptically evaluated to provide four-step ratings. The rating signs given in Tables 3 and 4 have the following meanings.

⊚ . . . indicates that top and bottom surfaces were lattice-like or honeycomb-like, and had the same appearances.

○ . . . indicates that top and bottom surfaces were lattice-like or honeycomb-like, or alternatively, had the same surface appearance.

Δ . . . indicates that top and bottom surfaces had generally uniform appearances.

× . . . indicates the reduced uniformity of thermoplastic resin foam.

(Surface Smoothness)

The surface properties of resultant thermoplastic resin foam were organoleptically evaluated to provide four-step ratings. The rating signs given in Table 1 have the following meanings.

⊚ . . . indicates that top and bottom surfaces were both extremely smooth.

○ . . . indicates that top and bottom surfaces were both smooth

Δ . . . indicates that top and bottom surfaces were both mostly smooth although one surface had small irregularities.

× . . . indicates that a top surface had large irregularities.

In Tables 1 and 2, PP represents polypropylene (manufactured by Mitsubishi Petrochemical Co., product name: MA3, melt index (MI)=11 g/10 minutes), silane-modified PP represents crosslinkable, silane-modified polypropylene (manufactured by Mitsubishi Petrochemical Co., product name: XPM800H, MI=11 g/10 minutes, 80 weight % of gel fraction after crosslinking), and HDPE represents high-density polyethylene (manufactured by Mitsubishi Petrochemical Co., product name: HY340, MI=1.5 g/10 minutes). The term "unmeasurable", used in the raw of flexural strength, indicates that the increased degree of displacement in bend, due to a low degree of flexural rigidity, resulted in no showing of fracture strength.

TABLE 1

|  | Unit | Exp. 1 | Exp. 2 | Exp. 3 | Exp. 4 | Exp. 5 | Exp. 6 | Exp. 7 | Exp. 8 |
|---|---|---|---|---|---|---|---|---|---|
| Thermoplastic Resin |  |  |  |  |  |  |  |  |  |
| PP | Parts by Weight | 100 | 100 | 100 | 100 | 100 | 100 | 100 | 100 |
| Silane-Modified PP | Parts by Weight | 20 | 20 | 20 | 20 | 20 | 20 | 20 | 20 |
| HDPE | Parts by Weight |  |  |  |  |  |  |  |  |
| Roll |  |  |  |  |  |  |  |  |  |
| Fashion of Arranging Recesses Sheet-Form Structure |  | Random | Random | Lattice-Like | Zigzag | Random | Lattice-Like | Zigzag | Random |
| Granules |  |  |  |  |  |  |  |  |  |
| Shape |  | Cylinder | Cylinder | Cylinder | Cylinder | Cylinder | Cylinder | Cylinder | Cylinder |
| Height | mm | 5 | 5 | 5 | 5 | 5 | 5 | 5 | 5 |
| Diameter | mm | 4 | 4 | 4 | 4 | 4 | 4 | 4 | 4 |

TABLE 1-continued

|  | Unit | Exp. 1 | Exp. 2 | Exp. 3 | Exp. 4 | Exp. 5 | Exp. 6 | Exp. 7 | Exp. 8 |
| --- | --- | --- | --- | --- | --- | --- | --- | --- | --- |
| Spacing | mm | Generally Uniform | Generally Uniform | 10.2 | 10.1 | Generally Uniform | 10.2 | 10.1 | Generally Uniform |
| Thin Film |  |  |  |  |  |  |  |  |  |
| Thickness | mm | 0.4 | 0.4 | 0.4 | 0.4 | 0.4 | 0.4 | 0.4 | 0.4 |
| Joint Region |  | End | End | End | End | Center | Center | Center | End |
| Planar Member Foaming Method |  | Absent | Absent | Absent | Absent | Absent | Absent | Absent | Present |
| Basis Weight | g/m² | 1000 | 1000 | 1000 | 1000 | 1000 | 1000 | 1000 | 1045 |
| Foam Properties |  |  |  |  |  |  |  |  |  |
| Expansion Ratio |  | 10 | 10 | 10 | 10 | 10 | 10 | 10 | 10 |
| Thickness | mm | 9.5 | 9.5 | 9.5 | 9.5 | 9.5 | 9.5 | 9.5 | 10 |
| Thickness Variation | mm | 0.8 | 0.7 | 0.5 | 0.5 | 0.7 | 0.5 | 0.5 | 0.6 |
| Pseudo-One-Dimensional Expandability |  | 1.03 | 1.03 | 1.03 | 1.03 | 1.03 | 1.03 | 1.03 | 1.00 |
| 25% Compressive Strength | kgf/cm² | 5.98 | 6.26 | 6.57 | 6.68 | 6.28 | 6.58 | 6.71 | 6.34 |
| Compressive Strength Variation | kgf/cm² | 0.31 | 0.22 | 0.15 | 0.16 | 0.21 | 0.14 | 0.14 | 0.15 |
| Flexural Strength | kgf/cm² | 12.3 | 16.2 | 19.2 | 20.3 | 16.1 | 19.0 | 20.1 | 24.5 |
| Surface Appearances |  | Δ | Δ | ○ | ○ | ○ | ◎ | ◎ | Δ |
| Surface Smoothness |  | Δ | ○ | ○ | ○ | ○ | ○ | ○ | ○ |

TABLE 2

|  | Unit | Exp. 9 | Exp. 10 | Exp. 11 | Exp. 12 | Exp. 13 | Exp. 14 | Exp. 15 | Exp. 16 | Comp. Exp. 1 | Comp. Exp. 2 |
| --- | --- | --- | --- | --- | --- | --- | --- | --- | --- | --- | --- |
| Thermoplastic Resin |  |  |  |  |  |  |  |  |  |  |  |
| PP | Parts by Weight | 100 | 100 | 50 | 50 | 50 | 50 | 50 | 50 | 100 | 100 |
| Silane-Modified PP | Parts by Weight | 20 | 20 | 20 | 20 | 20 | 20 | 20 | 20 | 20 | 20 |
| HDPE | Parts by Weight |  |  | 50 | 50 | 50 | 50 | 50 | 50 |  |  |
| Roll |  |  |  |  |  |  |  |  |  |  |  |
| Fashion of Arranging Recesses |  | Lattice-Like | Zigzag | Random | Lattice-Like | Zigzag | Zigzag | Zigzag | Zigzag | — | — |
| Sheet-Form Structure |  |  |  |  |  |  |  |  |  |  |  |
| Granules |  |  |  |  |  |  |  |  |  |  |  |
| Shape |  | Cylinder | Cylinder | Cylinder | Cylinder | Cylinder | Cylinder | Cylinder | Cylinder | — | — |
| Height | mm | 5 | 5 | 5 | 5 | 5 | 5 | 5 | 5 | — | — |
| Diameter | mm | 4 | 4 | 4 | 4 | 4 | 4 | 4 | 4 | — | — |
| Spacing | mm | 10.2 | 10.1 | Generally Uniform | 10.2 | 10.1 | 10.1 | 10.1 | 10.1 | — | — |
| Thin Film |  |  |  |  |  |  |  |  |  |  |  |
| Thickness | mm | 0.4 | 0.4 | 0.4 | 0.4 | 0.4 | 0.4 | 0.4 | 0.4 | — | — |
| Joint Region |  | End | End | End | End | End | Center | Center | Center | — | — |
| Planar Member Foaming Method |  | Present | Present | Absent | Absent | Absent | Absent | Present | Present | — | — |
| Basis Weight | g/m² | 1045 | 1045 | 1000 | 1000 | 1000 | 1000 | 1045 | 1045 | 1000 | 1000 |
| Foam Properties |  |  |  |  |  |  |  |  |  |  |  |
| Expansion Ratio |  | 10 | 10 | 10 | 10 | 10 | 10 | 10 | 20 | 10 | 10 |
| Thickness | mm | 10 | 10 | 9.7 | 9.7 | 9.7 | 9.7 | 10 | 20 | 2.15 | 6.4 |
| Thickness Variation | mm | 0.4 | 0.4 | 0.6 | 0.4 | 0.4 | 0.2 | 0.3 | 0.3 | 1.1 | 2.4 |

TABLE 2-continued

|  | Unit | Exp. 9 | Exp. 10 | Exp. 11 | Exp. 12 | Exp. 13 | Exp. 14 | Exp. 15 | Exp. 16 | Comp. Exp. 1 | Comp. Exp. 2 |
|---|---|---|---|---|---|---|---|---|---|---|---|
| Pseudo-One-Dimensional Expandability | | 1.00 | 1.00 | 1.02 | 1.02 | 1.02 | 1.02 | 1.00 | 1.00 | 2.15 | 1.25 |
| 25% Compressive Strength | kgf/cm$^2$ | 6.67 | 6.80 | 6.32 | 6.67 | 6.71 | 7.02 | 7.24 | 3.90 | 1.95 | 4.02 |
| Compressive Strength Variation | kgf/cm$^2$ | 0.08 | 0.08 | 0.16 | 0.12 | 0.11 | 0.10 | 0.05 | 0.06 | 0.35 | 0.69 |
| Flexural Strength | kgf/cm$^2$ | 28.2 | 30.1 | 17.5 | 20.8 | 21.5 | 21.4 | 31.2 | 4.12 | Unmeasurable | 9.0 |
| Surface Appearances | | ○ | ○ | △ | ○ | ○ | ◎ | ◎ | ◎ | x | x |
| Surface Smoothness | | ○ | ○ | ◎ | ◎ | ◎ | ◎ | ◎ | ◎ | x | x |

As can be seen clearly from Table 2, the thermoplastic resin foam obtained in Comparative Example 1 exhibits an expansion ratio of 10. However, its extremely high pseudo-one-dimensional expandability of 2.15 demonstrates that the thermoplastic resin foam experienced a rather higher degree of expansion, even in length and width directions. In addition, the surge of thermoplastic resin foam presented poor results in thickness precision, surface appearance, and surface smoothness. Furthermore, the thermoplastic resin foam exhibited the reduced compressive strength of 1.95 kgf/cm$^2$, due to its homogeneous nature. The flexural strength of thermoplastic resin foam was unmeasurable for its excessively low degree of stiffness.

Also, Comparative Example 2 utilized pellets of expandable thermoplastic resin to obtain a thermoplastic resin foam having an expansion ratio of 10. The thermoplastic resin foam exhibited the reduced pseudo-one-dimensional expandability compared to the thermoplastic resin foam of Comparative Example 1, since the pellets of expandable thermoplastic resin were spaced from each other. Still, its value of 1.25 is relatively high, due to the dependency thereof upon how precisely the pellets of expandable thermoplastic resin were dispersed, demonstrating that the thermoplastic resin foam experienced a rather higher degree of expansion, even in both length and width directions. This leads to the increased variation in thickness of the thermoplastic resin foam.

Due to the formation of slightly-expanded thin films, the thermoplastic resin foam obtained exhibited a compressive strength of 4.02 kgf/cm, which value, although higher than that of Comparative Example 1, is still relatively low, as well as a very large variation in compressive strength. Also in the evaluation of surface smoothness, the thermoplastic resin foam was observed as having large surface irregularities which depended upon how precisely the pellets of expandable thermoplastic resin were spread.

Also, its flexural strength is low in value, due to the absence of foam layers continuous in length and width directions of the foam.

In contrast, the thermoplastic resin foams obtained in Examples 1–15 exhibited the pseudo-one-dimensional expandabilities within 1.03, i.e. approximation of 1, due to the use of expandable thermoplastic resin sheet including granules of expandable thermoplastic resin planarly arranged in a generally uniform fashion. This demonstrates the ability of the method to manufacture thermoplastic resin foams while effectively restraining expansion thereof in length and width directions. In addition, their variations in thickness were rather small, i.e., within 0.8 mm.

Due to the formation of slightly-expanded thin films, the thermoplastic resin foams obtained exhibited the increased compressive strengths equal to or higher than 5.98 kgf/cm$^2$, as well as the reduced variations in compressive strength equal to or lower than 0.31 kgf/cm$^2$. This demonstrates the general uniformity of the thermoplastic resin foams obtained.

Due to the presence of foam layers continuous in both length and width directions, the thermoplastic resin foams obtained also exhibited the increased flexural strengths equal to or higher than 12.3 kgf/cm$^2$.

As can be appreciated from the comparison between Examples 1 and 2, the thermoplastic resin foam which constitutes a single layer in its thickness direction is imparted thereto superior compressive and flexural strengths and increased surface smoothness, compared to the thermoplastic resin foam which is multi-layered in its thickness direction.

As can be appreciated from the respective comparisons among Examples 2–4, among Examples 5–7, among Examples 8–10, and among Examples 11–13, the arrangement of granules of expandable thermoplastic resin, when made in a lattice-like fashion, results in the formation of thermoplastic resin foams having increased compressive and flexural strengths than when made randomly in a generally uniform manner, and further, when made in a zigzag fashion, results in the formation of thermoplastic resin foams having superior compressive strengths to when made otherwise.

As can also be appreciated from the respective comparisons among Examples 2–4 and among Examples 5–7, and from the comparison between Examples 13 and 14, the thin film of expandable thermoplastic resin, when connected to respective central regions of the granules of expandable thermoplastic resin, provides thermoplastic resin foams having superior surface appearances to when connected to respective end regions of the granules of expandable thermoplastic resin.

As further apparent from the respective comparisons among Examples 2–4 and among Examples 8–10, and from the comparison between Examples 14 and 15, the pseudo-one-dimensional expandablities of approximately 1 can be accomplished by combining an expandable thermoplastic resin containing a blowing agent with a planar member to constitute a thin film of expandable thermoplastic resin. The use of planar member effectively restrains the sheet-form structures from expanding in their length and width directions. Also, since the planar member takes the continuous form in both length and width directions of a resultant foam, the flexural strengths of foams can be increased to a great extent.

As can also be appreciated from the respective comparisons among Examples 2–4 and among Examples 11–13, where the granules of expandable thermoplastic resin are comprised of a mixture containing a blowing agent and mutually substantially incompatible, highly-crosslined resin composition and slightly-crosslinked or uncrosslinked resin composition, resultant thermoplastic resin foams consistently exhibit an excellent surface smoothness.

Example 15 utilized the most preferred sheet-form structure of expandable thermoplastic resin which exhibited a high degree of pseudo-one-dimensional expandability, and produced a thermoplastic resin foam which had the increased thickness precision, excellent compressive strength and reduced variation thereof, increased flexural strength, comparable top and bottom surface appearances, and increased surface smoothness.

Cutting was transversely applied to the thermoplastic resin foam of Example 13 to observe its section. The observation revealed that the continuous foam layer $4c$ carried thereon highly-expanded portions $4a$ which respectively had outer surfaces covered with respective slightly-expanded thin films $4b$. The thickness of slightly-expanded thin film $4b$ was 200 µm, while the size of highly-expanded portion $4a$ was 11.3 µm. The expansion ratio of slightly-expanded thin film $4b$ was measured to be 1.8, while that of highly-expanded portion $4a$ to be 12.3

MANUFACTURE AND OTHERS OF SHEET-FORM STRUCTURE OF EXPANDABLE THERMOPLASTIC RESIN (2)

EXAMPLES 17–26 AND COMPARATIVE EXAMPLE 5

A composition containing a thermoplastic resin in the proportion (parts by weight) shown in Tables 3, 0.1 parts by weight of dibutyltin dilaurate, as a catalyst for silane-crosslinking, and 4 parts by weight of azodicarbonamide (manufactured by Otsuka Chemical Co., product name: SO-20, decomposition temperature of 210° C.), as a heat-decomposable blowing agent, was fed to a twin-screw extruder 11, as shown in FIG. 5, which had a diameter of 44 mm. The above-specified composition was melt mixed in the twin-screw extruder 11 at 180° C., and was then extruded from a T-die 12 having a face length of 500 mm and a lip of 1.0 mm to produce a sheet-form expandable thermoplastic resin in a softened state.

The sheet-form expandable thermoplastic resin was further introduced between a pair of shaping rolls 13, 14 with recesses being provided in the roll 13 in a fashion as indicated in Tables 4, each having a diameter of 250 mm and a face length of 500 mm, to concurrently shape and cool the sheet-form expandable thermoplastic resin which was subsequently immersed in water at 98° C. for 2 hours and dried. As a consequence, a sheet-form structure 5 of expandable thermoplastic resin having a configuration indicated in Table 1 was obtained.

CONFIGURATIONS AND OTHERS OF SHEET-FORM STRUCTURES OF EXPANDABLE THERMOPLASTIC RESIN OF EXAMPLES 17–26 AND COMPARATIVE EXAMPLE 5

In the sheet-form structures of expandable thermoplastic resin of Examples 17–26 and Comparative Example 5, respectively obtained in the manner as stated above, each sheet-form structure defined granules of expandable thermoplastic resin at its portions having corresponded in location to the recesses on the aforementioned shaping roll 13. The granules of expandable thermoplastic resin were integrally connected to each other through a thin film of expandable thermoplastic resin, which together constituted the sheet-form structure of expandable thermoplastic resin.

Each of the sheet-form structures of expandable thermoplastic resin obtained in a manner as stated above was subjected to evaluations. The shape, arrangement, height and diameter of granules of expandable thermoplastic resin, center distance between neighboring granules, and thickness of a thin film of expandable thermoplastic resin are given in the following Tables 4, 5, respectively.

The height of granule of expandable thermoplastic resin, as termed above, refers to a vertical dimension of the granule, exclusive of a thickness of the thin film of expandable thermoplastic resin, if the granule is at its one vertical end connected to the thin film.

COMPARATIVE EXAMPLE 3

A composition containing a thermoplastic resin in the proportion (parts by weight) shown in Tables 3, 0.1 parts by weight of dibutyltin dilaurate, as a catalyst for silane-crosslinking, and 4 parts by weight of azodicarbonamide (manufactured by Otsuka Chemical Co., product name: SO-20, decomposition temperature of 210° C.), as a heat-decomposable blowing agent, was fed to a twin-screw extruder 11, as shown in FIG. 5, which had a diameter of 44 mm. The above-specified composition was melt mixed in the twin-screw extruder 11 at 180° C., and was then extruded from a T-die 12 having a face length of 500 mm to produce a sheet-form expandable thermoplastic resin in a softened state.

The sheet-form expandable thermoplastic resin thus extruded from the T-die 12 was then introduced between a pair of rolls, with no recess being provided thereon and each having a diameter of 250 mm and a face length of 500 mm, to cool the sheet-form expandable thermoplastic resin. The sheet thus cooled was subsequently immersed in water at 98° C. for 2 hours and dried to obtain a flat sheet-form structure of expandable thermoplastic resin having a thickness of 1.0 mm.

COMPARATIVE EXAMPLE 4

A composition containing a thermoplastic resin in the indicated parts by weight in Table 3, 0.1 parts by weight of dibutyltin dilaurate, as a catalyst for crosslinking, and 4 parts by weight of azodicarbonamide (manufactured by Otsuka Chemical Co., product name: SO-20, decomposition temperature of 210° C.), as a heat-decomposable blowing agent, was fed to the twin-screw extruder 11 in the same manner as in Example 1, and extruded from the T-die 12 into a sheet form in the same manner as in Example 1. The sheet thus extruded was then cooled by introducing the sheet between a pair of rolls, with no recess being provided on their surfaces and each having a diameter of 250 mm and a face length of 500 mm, and then pelletized for immersion in water at 98° C. for 2 hours and subsequent drying. Consequently, 5×5 mm, 1.5 mm thick pellets of expandable thermoplastic resin were obtained.

MANUFACTURE OF THERMOPLASTIC RESIN FOAMS (2)

EXAMPLES 17–26

In Examples 17–26, the expandable thermoplastic resin sheet 1 obtained in the manner as described above, measuring the weight as indicated in Table 1, was placed on a fluoroethylene resin sheet 15, as shown in FIG. 7(a) Subsequent to further placement of another fluoroethylene sheet 16 on the expandable thermoplastic resin sheet 1, the stack was heated for 10 minutes by using a 210° C. handpress to foam the sheet, and subsequently transferred to a 30° C. cooling press, defining the clearance indicated in Table 4, to cool the sheet for 10 minutes. As a result, an irregularly-surfaced, thermoplastic resin foam was obtained.

The irregularly-surfaced, thermoplastic resin foam thus obtained was measured for thickness, expansion ratio, and pseudo-one-dimensional expandability, according to the evaluation methods as employed in Examples 1–16. The results are given in Table 5.

COMPARATIVE EXAMPLE 3

In Comparative Example 3, the aforementioned expandable thermoplastic resin sheet, measuring the weight as indicated in Table 4, was placed on a fluoroethylene resin sheet 15. The remaining procedure was carried out in the same manner as described above to obtain a thermoplastic resin foam.

The thermoplastic resin foam thus obtained was measured for thickness, expansion ratio, and pseudo-one-dimensional expandability, in the same manner as in Examples 17–26. The results are given in Table 5.

COMPARATIVE EXAMPLE 4

In Comparative Example 4, the aforementioned pellets of expandable thermoplastic resin, instead of the above sheet-form structure of expandable thermoplastic resin, were spread for dispersion on a fluoroethylene sheet 15 so as to measure a weight of 1000 g/m$^2$. The succeeding procedure was carried out in the same manner as above to obtain a thermoplastic resin foam.

The thermoplastic resin foam thus obtained was measured for thickness, expansion ratio, and pseudo-one-dimensional expandability, in the same manner as in Examples 17–26. The results are given in Table 5.

COMPARATIVE EXAMPLE 5

In Comparative Example 5, the sheet-form structure of expandable thermoplastic resin 1 obtained in the manner as described above, measuring the weight as indicated in Table 4, was placed on a fluoroethylene resin sheet 15, as analogously to Examples 17–26. Subsequent to further placement of another fluoroethylene sheet 16 on the sheet-form structure of expandable thermoplastic resin, the stack was heated for 10 minutes by using a 210° C. handpress to foam the sheet-form structure, and subsequently transferred to a 30° C. cooling press, defining the clearance indicated in Table 4, to cool the sheet-form structure for 10 minutes. As a result, a thermoplastic resin foam was obtained.

The thermoplastic resin foam thus obtained was measured for thickness, expansion ratio, and pseudo-one-dimensional expandability, in the same manner as in Examples 17–26. The results are given in Table 5.

EVALUATION (2)

EXAMPLES 18, 20, 22, 24, 26

The irregularly-surfaced, thermoplastic resin foam obtained was successively used for evaluation.

The thickness and expansion ratio of irregularly-surfaced, thermoplastic resin foam, as well as the presence of concaves, height of concedes and packing ratio, were respectively measured in the manner as described below. The results are given in Table 5.

(THICKNESS)

The thickness of irregularly-surfaced, thermoplastic resin foam obtained was measured by using a vernier caliper.

(EXPANSION RATIO)

The expansion ratio of irregularly-surfaced, thermoplastic resin foam obtained was measured according to an underwater substitution method.

(PRESENCE OF CONCAVES)

The presence of concave having a depth of at least 1 mm was visually determined.

(HEIGHT OF CONCEDES)

The irregularly-surfaced, thermoplastic resin foam was longitudinally sectioned. A part of highly-expanded portion, which has an outer surface part covered with a slightly-expanded thin film portion unfused to adjacent slightly-expanded thin films, was measured using a vernier caliper for maximum dimension in a thickness direction of the foam.

(PACKING RATIO)

A ratio of a volume (true volume) which can be calculated by dividing a weight of irregularly-surfaced thermoplastic resin foam by its density, to a volume (bulk volume) of a rectangular parallelepiped which can be calculated from a maximum height and a flat area of the irregularly-surfaced thermoplastic resin foam when placed on a flat plate, was taken as a packing ratio.

COMPARATIVE EXAMPLES 3, 4

800 g/m$^2$ of the thermoplastic resin foam obtained was loaded into a 200×200×5 mm closable mold which had on its one surface a number of recesses, each having a depth of 3 mm and a diameter of 10 mm, arranged in a zigzag fashion to define a center distance of 10.1 mm, and thermally shaped at a temperature of 170° C. and under a pressure of 0.5 kgf/cm$^2$ to obtain, an evaluation sample as indicated in Table 5.

The thickness and expansion ratio of the irregularly-formed thermoplastic resin foam thus obtained, as well as the presence of concave, height of convex and packing ratio, were measured in the same manner as in Examples. The results are given in Table 5.

COMPARATIVE EXAMPLE 5

The plate-form thermoplastic resin foam obtained was successively employed for evaluation.

The thickness and expansion ratio of the plate-form thermoplastic resin foam, as well as the presence of concave, height of convex and packing ratio, were measured in the same manner as in Examples. The results are given in Table 5.

The thermoplastic resin foams, irregularly-formed or in the plate-form, were measured for thickness variation, variation in compressive deformation, and maximum impact force, in the manner as described below.

(THICKNESS VARIATION)

The foams of n=20 were measured for thickness, and the difference between maximum and minimum values obtained was taken as a thickness variation.

(COMPRESSIVE DEFORMATION)

A 200 mm×200 mm strip was cut from the foam. A 3 mm thick plywood was applied onto one surface of the foam strip, opposite to its irregular surface, for subsequently subjecting to compressive testing which utilized a cylindrical indenter of φ 50 mm for indentation at a speed of 2 m/min. A depression formed at a load of 80 kgf was measured to determine a compressive deformation.

(MAXIMUM IMPACT FORCE)

A 200 mm×200 mm strip was cut from the foam. A 3 mm thick plywood was applied onto one surface of the foam strip, opposite to its irregular surface, for subsequently subjecting to pact by a hammer, according to JIS A1418, dropped from a height of 40 mm. A maximum impact force was measured by using an acceleration sensor.

TABLE 3

|  |  | Thermoplastic Resin | | |
|---|---|---|---|---|
|  |  | PP (Parts by Weight) | Silane-Modified PP (Parts by Weight) | HDPE (Parts by Weight) |
| Exp. | 17 | 50 | 50 | 20 |
|  | 18 | 50 | 50 | 20 |
|  | 19 | 50 | 50 | 20 |
|  | 20 | 50 | 50 | 20 |
|  | 21 | 50 | 50 | 20 |

TABLE 3-continued

|  |  | Thermoplastic Resin | | |
|---|---|---|---|---|
|  |  | PP (Parts by Weight) | Silane-Modified PP (Parts by Weight) | HDPE (Parts by Weight) |
|  | 22 | 50 | 50 | 20 |
|  | 23 | 50 | 50 | 20 |
|  | 24 | 50 | 50 | 20 |
|  | 25 | 50 | 50 | 20 |
|  | 26 | 50 | 50 | 20 |
| Comp. Exp. | 3 | 50 | 50 | 20 |
|  | 4 | 50 | 50 | 20 |
|  | 5 | 50 | 50 | 20 |

In Table 3, PP represents polypropylene (manufactured by Mitsubishi Petrochemical Co., product name: MA3, melt index (MI)=11 g/10 minutes), silane-modified PP represents crosslinkable, silane-modified polypropylene (manufactured by Mitsubishi Petrochemical Co., product name: XPM800H, MI=11 g/10 minutes, 80 weight % of gel fraction after crosslinking), and HDPE represents high-density polyethylene (manufactured by Mitsubishi Petrochemical Co., product name: HY340, MI=1.5 g/10 minutes).

TABLE 4

|  | Sheet-Form Structure of Thermoplastic Resin | | | | | Thermoplastic Resin Foam | | | | | Thickness of Foam When Fully Packed (mm) |
|---|---|---|---|---|---|---|---|---|---|---|---|
|  | Thermoplastic Resin Granules | | | Thin Film Thickness (mm) | Basis Weight (g/m²) | Foaming Conditions Clearance from a Cooling Unit (mm) | Foam Thickness (mm) | Expansion Ratio | Pseudo-One-Dimensional Expandability | |
|  | Arrangement | Height (mm) | Diameter (mm) | Spacing (mm) | | | | | | | |
| Exp. | | | | | | | | | | | |
| 17 | Random | 5 | 4 | — | 0.3 | 1000 | 10 | 10 | 8 | 1.00 | 8 |
| 18 | Random | 3.5 | 4 | — | 0.3 | 800 | 8 | 8 | 8 | 1.00 | 6.4 |
| 19 | Lattice-Like | 5 | 4 | 9.4 | 0.3 | 1000 | 10 | 10 | 8 | 1.00 | 8 |
| 20 | Lattice-Like | 3.5 | 4 | 9.4 | 0.3 | 800 | 8 | 8 | 8 | 1.00 | 6.4 |
| 21 | Zigzag | 5 | 4 | 10.1 | 0.3 | 1000 | 10 | 10 | 8 | 1.00 | 8 |
| 22 | Zigzag | 3.5 | 4 | 10.1 | 0.3 | 800 | 8 | 8 | 8 | 1.00 | 6.4 |
| 23 | Zigzag | 5 | 4 | 10.1 | 0.4 | 1100 | 10 | 10 | 8 | 1.00 | 8.8 |
| 24 | Zigzag | 3.5 | 4 | 10.1 | 0.4 | 900 | 8 | 8 | 8 | 1.00 | 7.2 |
| 25 | Zigzag | 3.3 | 4 | 10.1 | 0.1 | 570 | 10 | 10 | 8 | 1.00 | 4.6 |
| 26 | Zigzag | 2.5 | 4 | 10.1 | 0.1 | 450 | 8 | 8 | 8 | 1.00 | 3.6 |
| Comp. Exp. | | | | | | | | | | | |
| 3 | — | — | — | — | — | 1000 | 8 | 2 | 8 | 4.00 | — |
| 4 | — | — | — | — | — | 1000 | 8 | 6.4 | 8 | 1.25 | — |
| 5 | Zigzag | 5 | 4 | 10.1 | 0.4 | 1000 | 8 | 8 | 8 | 1.00 | 8 |

TABLE 5

| | Sample Configuration | | | Properties | | | |
| --- | --- | --- | --- | --- | --- | --- | --- |
| | Concave Portion | Height of Convex Portion (mm) | Packing Ratio (%) | Thickness Variation (mm) | Compressive Deformation (mm) | | Maximum Impact Force (N) |
| | | | | | Average | Variation | |
| Exp. | | | | | | | |
| 17 | Absent  | 3   | 80  | 0.1 | 1.25 | 0.10 | 390 |
| 18 | Present | 3   | 80  | 0.1 | 1.30 | 0.10 | 380 |
| 19 | Absent  | 3   | 80  | 0.1 | 1.15 | 0.05 | 350 |
| 20 | Present | 3   | 80  | 0.1 | 1.20 | 0.05 | 330 |
| 21 | Absent  | 3   | 80  | 0.1 | 1.10 | 0.05 | 350 |
| 22 | Present | 3   | 80  | 0.1 | 1.10 | 0.05 | 340 |
| 23 | Absent  | 0.5 | 90  | 0.1 | 1.10 | 0.05 | 400 |
| 24 | Present | 0.5 | 90  | 0.1 | 1.10 | 0.05 | 390 |
| 25 | Absent  | 6   | 45  | 0.1 | 1.35 | 0.10 | 340 |
| 26 | Present | 6   | 45  | 0.1 | 1.40 | 0.10 | 320 |
| Comp. Exp. | | | | | | | |
| 3 | Absent | 3 | 80  | 1.1 | 1.25 | 0.10 | 400 |
| 4 | Absent | 3 | 80  | 2.4 | 1.25 | 0.35 | 420 |
| 5 | Absent | 0 | 100 | 0.2 | 1.25 | 0.10 | 450 |

As can be seen clearly from Table 5, the irregularly-formed thermoplastic resin foam obtained in Comparative Example 3 exhibited an expansion ratio of 8. However, its extremely high pseudo-one-dimensional expandability of 4.00 demonstrates that the foam experienced a rather higher degree of expansion even in length and width directions. In addition, the surge of thermoplastic resin foam presented poor results in thickness variation. Also, due to its homogeneous nature, the thermoplastic resin foam exhibited the reduced compressive strength, and accordingly extremely increased depression of 2.2 mm.

Also, Comparative Example 4 utilized pellets of expandable thermoplastic resin to obtain a thermoplastic resin foam having an expansion ratio of 8. The thermoplastic resin foam exhibited the reduced pseudo-one-dimensional expandability compared to the thermoplastic resin foam of Comparative Example 3, since the pellets of expandable thermoplastic resin were spaced from each other. Still, its value of 1.25 is relatively high, due to the dependency thereof upon how precisely the pellets of expandable thermoplastic resin were spread, to demonstrate that the thermoplastic resin foam experienced a rather high degree of expansion even in length and width directions. This led to the increased variation in thickness of the thermoplastic resin foam.

Due to the formation of slightly-expanded thin films, the irregularly-formed thermoplastic resin foam obtained exhibited the increased compressive strength, compared to Comparative Example 1. It however exhibited a large compressive deformation of 1.75 mm, as well as a very large variation in compressive deformation.

Also, Comparative Example 5 utilized a sheet-form structure of expandable thermoplastic resin to obtain a thermoplastic resin foam which exhibited an expansion ratio of 8 and was three-dimensionally uniform. Due to its three-dimensional uniformity, the thermoplastic resin foam exhibited a small compressive deformation of 1.75 mm², as well as a small variation in compressive deformation. However, the thermoplastic resin foam exhibited a packing ratio of 100%, i.e., assumed the form of flat plate, so that a maximum impact force was increased to result in its failure to exhibit sufficient cushioning properties.

On the contrary, due to the formation of slightly-expanded thin films, the thermoplastic resin foams obtained in Examples 17–26 exhibited small compressive deformation within 1.4 mm, with its variation being also small, and can be found as being irregularly-formed, thermoplastic resin foams having high degrees of compressive strength.

Also, those thermoplastic resin foams are shown to be more than comparable in cushioning properties to the thermoplastic resin foam of Comparative Example 3 which, in turn, had the reduced compressive strength, and can thus be recognized as the thermoplastic resin foams which reconciled the compressive strength and cushioning properties.

As can also be appreciated from the comparison between Examples 17 and 18, between Examples 19 and 20, or between Examples 21 and 22, the thermoplastic resin foams defining either irregularities or concave portions were imparted thereto the reduced maximum impact force and superior cushioning properties.

As can further be appreciated from the comparisons among Examples 17, 19 and 21, or among Examples 18, 20, and 21, the arrangement of granules of expandable thermoplastic resin, when made in a lattice-like fashion, results in the formation of thermoplastic resin foam having higher compressive strength and cushioning properties than when made in a random fashion, and further, when made in a zigzag fashion, results in the formation of thermoplastic resin foam having the highest compressive strength.

As can further be appreciated from the comparisons among Examples 21–26, the thermoplastic resin foams, if configured to define convex portions having heights of 3 mm or greater, exhibit particularly higher degrees of cushioning properties, and, if configured to exhibit packing ratios in the range of 50–90%, exhibit the reconciled compressive strength and cushioning properties.

EFFECTS OF THE INVENTIONS

As stated earlier, in the sheet-form structure of expandable thermoplastic resin according to the first invention, the granules of expandable thermoplastic resin are arranged generally in a uniform fashion, and integrally connected to each other through the thin film of expandable thermoplastic resin. Accordingly, when heated to a temperature sufficient to cause decomposition of a blowing agent, the sheet-form structure undergoes the pseudo-one-dimensional expansion, i.e., expands not in its planar direction but substantially solely in its thickness direction to produce a thermoplastic resin foam. That is, the presence of granules of expandable thermoplastic resin prevents the thin film of expandable thermoplastic resin from expanding in its planar direction, and the expansion thereof proceeds to fill spacings initially provided between the neighboring granules of expandable thermoplastic resin, resulting in the formation of pseudo-one-dimensionally expanded thermoplastic resin foam. This eliminates the necessity of applying a widthwise or lengthwise stretch or elongation to a resultant thermoplastic resin foam, thereby effectively increasing the productivity of thermoplastic resin foams.

In the prior methods utilizing pellets of expandable thermoplastic resin, the thickness precision, weight precision and su rface properties of a resultant thermoplastic resin foam vary depending largely upon how precisely the granules of expandable thermoplastic resin are dispersed. On the other hand, in the invention as recited in claim 1, the granules of expandable thermoplastic resin are arranged in a generally uniform manner for connection to each other through the thin film of expandable thermoplastic resin. This enables the formation of thermoplastic resin foam which is stable in qualities, i.e., exhibits less variations in thickness precision, weight precision and surface properties, and which has an increased compressive strength.

In the second invention, the granules of expandable thermoplastic resin are vertically centrally connected to each other through the thin film of expandable thermoplastic resin. This enables the formation of thermoplastic resin foam which has top and bottom surfaces both excellent in surface smoothness.

Also, according to the second invention, the above-described sheet-form structure of expandable thermoplastic resin can be obtained in a simplified manner.

The thermoplastic resin foam, according to the third invention, includes a continuous foam layer comprised of thermoplastic resin, a number of highly-expanded portions comprised of thermoplastic resin and provided on at least one surface of the continuous foam layer, and slightly-expanded thin films comprised of thermoplastic resin for covering outer surfaces of respective highly-expanded portions. Since the highly-expanded portions are heat fused to each other through the aforementioned slightly-expanded thin films, the reduced variations in thickness precision and weight precision, increased surface smoothness, and increased compressive strength with a slight variation can be imparted to the thermoplastic resin foam. In addition, the continuous foam layer is heat fused to the highly-expanded portions in a manner as to successively connect the highly-expanded portions. This prevents the occurrence of separation or fracture at fusion interfaces between the neighboring slightly-expanded thin films to assure the increased flexural strength.

The thermoplastic resin foam, according to the fourth invention, includes a continuous foam layer comprised of thermoplastic resin, a number of highly-expanded portions comprised of thermoplastic resin portions and provided on at least one surface of the continuous foam layer, and slightly-expanded thin films comprised of thermoplastic resin which, together with the continuous foam layer, enclose peripheral surfaces of respective highly-expanded portions. At least one surface of the resin foam, located on a side where the highly-expanded portions are uncovered with the continuous foam layer, is irregularly formed in such a manner as to define concedes at the highly-expanded portions covered with the respective slightly-expanded thin films, and conclaves at its portions between neighboring highly-expanded portions. This enables the formation of thermoplastic resin foam which exhibits the reduced variations in thickness precision and weight precision, increased compressive strength with a slight variation, excellent cushioning action.

Accordingly, the practice of the method of fifth invention for manufacturing a thermoplastic resin foam, if accompanied by the use of the sheet-form structure of expandable thermoplastic resin according to the first invention, results not only in the highly-productive manufacture of thermoplastic resin foam, according to the third invention, which exhibits excellent qualities such as in thickness precision, weight precision, surface smoothness and compressive strength with less variations thereof, but also in the highly-productive manufacture of irregularly-formed thermoplastic resin foam, according to the fourth invention, which exhibits excellent qualities such as in thickness precision, weight precision, compressive strength and cushioning properties with less variations thereof.

What is claimed is:

1. A thermoplastic resin foam comprising, a continuous thermoplastic resin foam layer, a number of highly-expanded, thermoplastic resin portions, wherein all of said thermoplastic resin portions are provided on a first surface or a second surface of said continuous foam layer, and slightly expanded, thermoplastic resin thin films covering outer surfaces of respective highly-expanded portions, and wherein said highly-expanded portions are thermally fused to each other through said slightly-expanded thin films;

wherein the highly-expanded portions are directly heat fused to the first surface or the second surface of said continuous thermoplastic resin foam layer and the outer surface of the highly expanded portions are covered with the slightly expanded thin film in a region other than that heat-fused to the continuous thermoplastic resin foam layer.

2. The thermoplastic resin film of claim 1, wherein said highly-expanded portions are provided solely on said first surface of said continuous foam layer and in a manner so as to not vertically overlap each other and to define a vertically single layer, and laterally fused to each other through said slightly-expanded thin films.

3. The thermoplastic resin foam of claim 1, wherein some of said highly-expanded portions are provided on said first surface and any other of said highly-expanded portions are provided on an opposite surface of said continuous foam layer and in a manner so as to not vertically overlap each other and to define a vertically single layer, and laterally fused to each other through said slightly-expanded thin films.

4. A method of manufacturing a thermoplastic resin foam in accordance with claim 1, comprising the steps of:

heating a sheet-form structure of expandable thermoplastic resin, which includes granules of expandable thermoplastic resin containing a blowing agent and planarly arranged in a generally uniform fashion for integral connection to each other through a thin film of expandable thermoplastic resin, to a temperature sufficient to decompose said blowing agent to thereby effect foaming thereof; and cooling the foam obtained in the first step.

5. A thermoplastic resin foam of claim 1, wherein an expansion ratio of the high expanded foams is in a range of 2 to 100.

6. A thermoplastic resin foam of claim 1, wherein an expansion ratio of the low expanded foamed layer is in a range of 1.1 to 10.

7. A thermoplastic resin foam of claim 1, wherein an expansion ratio of the continuous foaming layer is in a range of 1.1 to 10.

8. A thermoplastic resin film takes the form of a plate and comprises a continuous, thermoplastic resin foam layer, a number of highly-expanded, thermoplastic resin portions provided on at least one surface of said continuous foam layer, and slightly-expanded, thermoplastic resin thin films, together with respective highly-expanded portions, enclosing peripheries of respective highly-expanded portions, and that at least one surface of the thermoplastic resin foam, located on a side where said highly-expanded portions are uncovered by respective slightly-expanded thin films, is configured in such a manner as to define convexities at highly-expanded portions covered with respective slightly-expanded thin film and concaves at portions located between neighboring highly-expanded portions.

9. The thermoplastic resin foam of claim 8, wherein one surface of the thermoplastic resin foam, located on a side where said highly-expanded portions are covered not with the continuous foam layer but with respective slightly-expanded thin films, is irregularly formed in such a manner as to define convexities at highly-expanded portions covered with respective slightly-expanded thin films and concaves at portions located between neighboring highly-expanded portions, and wherein another surface of the thermoplastic resin foam, located on a side where the highly-expanded portions are covered with the continuous foam layer is configured in a manner as to define a number of concaves at least at portions corresponding in location to the highly-expanded portions.

10. A method of manufacturing an irregularly-surfaced thermoplastic resin foam in accordance with claim 9, comprising the steps of:

heating a sheet-form structure of expandable thermoplastic resin, which includes granules of expandable thermoplastic resin containing a blowing agent and planarly arranged in a generally unifor I fashion for integral connection to each other through a thin film of expandable thermoplastic resin, to a temperature sufficient to decompose said blowing agent to thereby effect foaming thereof; and cooling the foamed, sheet-form structure of thermoplastic resin in a cooling unit which has a space more than sufficient to completely accommodate the sheet-form structure, while expanding, to define a clearance therebetween.

11. The method of manufacturing an irregularly-surfaced thermoplastic resin foam as recited in claim 10, characterized that said granule of expandable thermoplastic resin comprises a mixture of a blowing agent, highly-crosslinked thermoplastic resin composition and slightly-crosslinked or uncrosslinked thermoplastic resin composition, said thermoplastic resin compositions being substantially incompatible with each other.

12. The thermoplastic resin foam of claim 8 or 9, wherein said convexities defined by the highly-expanded portions covered with respective slightly-expanded thin films have heights of 1 mm or greater.

13. The thermoplastic resin foam of claims 8 or 9, wherein a packing ratio, which is a proportion and volume of a circumscribing rectangular parallelepiped that is occupied by the circumscribed thermoplastic resin foam, is in a range of 50:1–90:1.

14. The thermoplastic resin foam of claims 8 or 9, wherein said highly-expanded portions are thermally fused to each other through the slightly-expanded thin films.

15. The thermoplastic resin foam of claims 8 or 9, wherein the n eighboring highly-expanded portions are spaced from each other, and connected to eachl other through the continuous foam layer.

16. The thermoplastic resin foam of claims 8 or 9, wherein said highly-expanded portions are arranged in a lattice fashion.

17. The thermoplastic resin foam of claims 8 or 9, wherein said highly-expanded portions are arranged in a zigzag fashion.

18. The thermoplastic resin foam of claims 8 or 9, wherein further comprising a planer member laminated onto said continuous foam layer.

* * * * *